United States Patent
Niinuma et al.

(10) Patent No.: US 10,185,399 B2
(45) Date of Patent: Jan. 22, 2019

(54) IMAGE PROCESSING APPARATUS, NON-TRANSITORY COMPUTER-READABLE RECORDING MEDIUM, AND IMAGE PROCESSING METHOD

(71) Applicant: FUJITSU LIMITED, Kawasaki-shi, Kanagawa (JP)

(72) Inventors: Koichiro Niinuma, Kawasaki (JP); Atsunori Moteki, Kawasaki (JP); Nobuyuki Hara, Meguro (JP); Toshiyuki Yoshitake, Kawasaki (JP); Taichi Murase, Kawasaki (JP); Masafumi Tada, Setagaya (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 27 days.

(21) Appl. No.: 15/050,900

(22) Filed: Feb. 23, 2016

(65) Prior Publication Data
US 2016/0291698 A1    Oct. 6, 2016

(30) Foreign Application Priority Data

Mar. 31, 2015    (JP) ................................. 2015-073837

(51) Int. Cl.
*G06F 3/01* (2006.01)
*G06T 11/60* (2006.01)
(Continued)

(52) U.S. Cl.
CPC ........... *G06F 3/017* (2013.01); *G02B 27/017* (2013.01); *G06K 9/00355* (2013.01); (Continued)

(58) Field of Classification Search
CPC ...... G02B 2027/0138; G02B 2027/014; G02B 2027/0141
See application file for complete search history.

(56) References Cited

U.S. PATENT DOCUMENTS

| 2011/0282673 | A1 | 11/2011 | Di Profio et al. |
| 2012/0293544 | A1 | 11/2012 | Miyamoto et al. |
| 2013/0120449 | A1* | 5/2013 | Ihara ................... G06F 11/0727 345/633 |
| 2013/0271360 | A1 | 10/2013 | MacDougall et al. |

(Continued)

FOREIGN PATENT DOCUMENTS

| JP | 2000-259307 | 9/2000 |
| JP | 2001-216069 | 8/2001 |

(Continued)

OTHER PUBLICATIONS

Raheja et al., "An Efficient Real Time Method of Fingertip Detection", *Proceedings of 7th International Conference on Trends in Industrial Measurements and Automation (TIMA 2011)*, CSIR Complex, Chennai, India, Jan. 6-8, 2011, pp. 447-450.

(Continued)

*Primary Examiner* — Chun-Nan Lin
(74) *Attorney, Agent, or Firm* — Staas & Halsey LLP

(57) ABSTRACT

An image processing apparatus including a memory, and a processor configured to make a display device display an image captured by an image capturing device, measure a time for which a hand region remains still when detecting the hand region in a first specific shape corresponding to a designation operation of designating a part in the image, identify the part designated by the designation operation when the time for which the hand region remains still reaches a predetermined time, and make a display device display an image resulting from execution of predetermined image processing for the identified part when at least one of a hand region in a second specific shape and a specific movement of a hand region is detected in the image captured by the image capturing device.

9 Claims, 40 Drawing Sheets

(51) Int. Cl.
*G06K 9/00* (2006.01)
*G02B 27/01* (2006.01)

(52) U.S. Cl.
CPC ........ *G06T 11/60* (2013.01); *G02B 2027/014* (2013.01); *G02B 2027/0138* (2013.01); *G02B 2027/0141* (2013.01)

(56) References Cited

U.S. PATENT DOCUMENTS

| | | | |
|---|---|---|---|
| 2013/0293544 A1 | 11/2013 | Schreyer et al. | |
| 2014/0236996 A1* | 8/2014 | Masuko | G06F 3/01 707/776 |
| 2014/0361985 A1* | 12/2014 | Arai | G06F 3/017 345/156 |
| 2015/0062000 A1* | 3/2015 | Saito | G02B 27/017 345/156 |
| 2015/0234471 A1 | 8/2015 | Ninuma | |
| 2016/0041619 A1* | 2/2016 | Ishiwata | G06F 1/163 715/857 |

FOREIGN PATENT DOCUMENTS

| | | |
|---|---|---|
| JP | 2009-10987 A1 | 1/2009 |
| JP | 2011-209787 | 10/2011 |
| JP | 2011-215856 | 10/2011 |
| JP | 2012-243007 A1 | 12/2012 |
| JP | 2013-161406 A1 | 8/2013 |
| JP | 2014-228945 A1 | 12/2014 |
| JP | 2015-153120 | 8/2015 |

OTHER PUBLICATIONS

Kato et al., "An Augmented Reality System and its Calibration based on Marker Tracking", *The Virtual Reality Society of Japan*, vol. 4 No. 4, Dec. 1999, pp. 607-616.

Japanese Office Action for Japanese Patent Application No. 2015-073837 dated Sep. 25, 2018.

* cited by examiner

FIG. 35
(1)
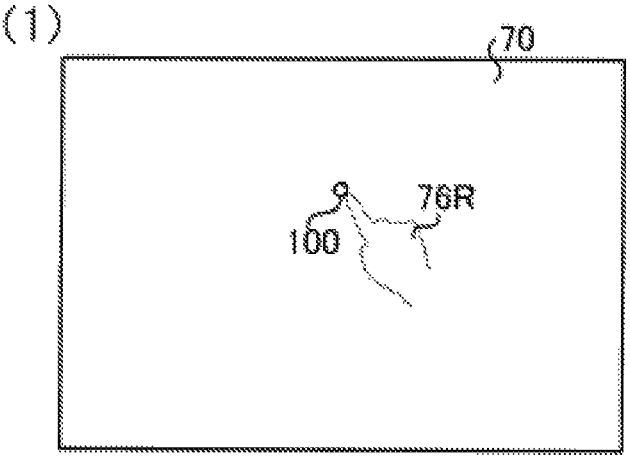
(2)
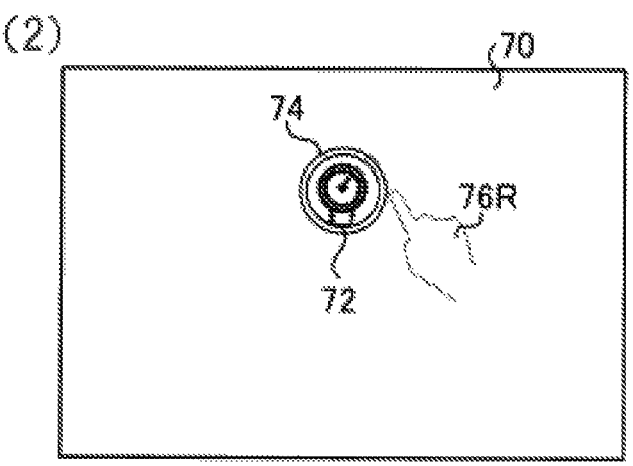

FIG. 37
(1)
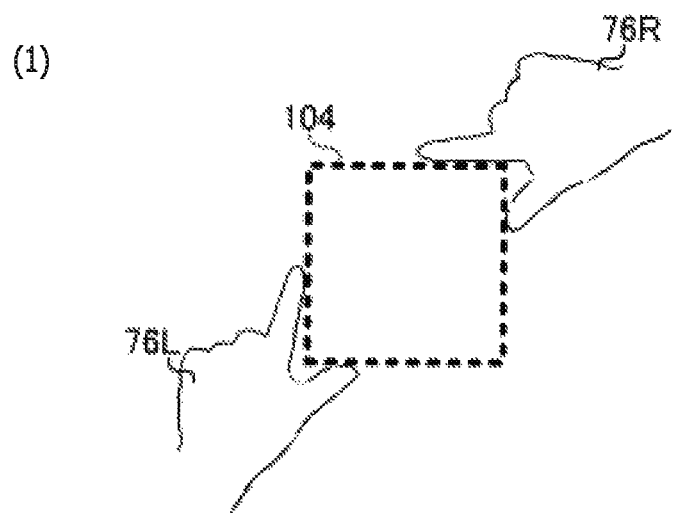
(2)
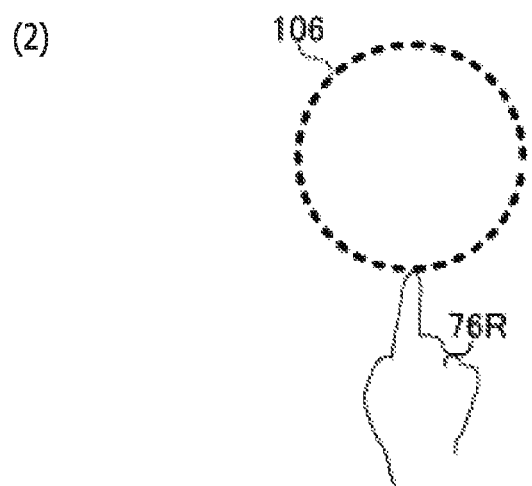

IMAGE PROCESSING APPARATUS, NON-TRANSITORY COMPUTER-READABLE RECORDING MEDIUM, AND IMAGE PROCESSING METHOD

CROSS-REFERENCE TO RELATED APPLICATION

This application is based upon and claims the benefit of priority of the prior Japanese Patent Application No. 2015-073837, filed on Mar. 31, 2015, the entire contents of which are incorporated herein by reference.

FIELD

The embodiments discussed herein are related to an image processing apparatus, an image processing program, and an image processing method.

BACKGROUND

There are known techniques of recognizing an operation of a user from an image captured by an image capturing device, and performing control or processing according to the recognized operation. As an input interface in a case where a user uses a display device mounted on the head of the user and disposed in front of an eye of the user, some of the aforementioned techniques are known to recognize various operations of the user from images of gestures performed by the user as the operations and captured by an image capturing device.

Meanwhile, there are also known techniques of determining whether an operation of a user is a failure, and determining whether recognition of an operation of a user is a failure. There is also known a technique of presenting a correct operation when the operation of a user is determined to be a failure.

Related techniques are disclosed, for example, in Japanese Laid-open Patent Publication Nos. 2011-215856, 2011-209787, 2001-216069, and 2000-259307.

SUMMARY

According to an aspect of the invention, an image processing apparatus including a memory, and a processor coupled to the memory and configured to make a display device display an image captured by an image capturing device, measure a time for which a hand region remains still when detecting the hand region in a first specific shape corresponding to a designation operation of designating a part in the image, identify the part designated by the designation operation when the time for which the hand region remains still reaches a predetermined time, and make a display device display an image resulting from execution of predetermined image processing for the identified part when at least one of a hand region in a second specific shape and a specific movement of a hand region is detected in the image captured by the image capturing device, each of the hand region in the second specific shape and the specific movement of the hand region corresponding to a specification operation of specifying the execution of the predetermined image processing for the identified part.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 35 is a diagram for describing an operation of the user and an image displayed by an HMD in an image processing system according to the fifth embodiment;

FIG. 37 is an explanatory diagram of another operation of the user;

DESCRIPTION OF EMBODIMENTS

When a user performs an operation by a gesture as an input interface in a case of using a display device mounted on the head of the user, the performed operation may be incorrect when the user is unfamiliar with the operation. Therefore, it may be difficult to recognize the operation of the user correctly.

According to an aspect, an operation of a user may be correctly recognized, even if the user is unfamiliar with the operation.

Examples of a technique discussed herein are described in detail below, with reference to the drawings.

[First Embodiment]

Figure 1:
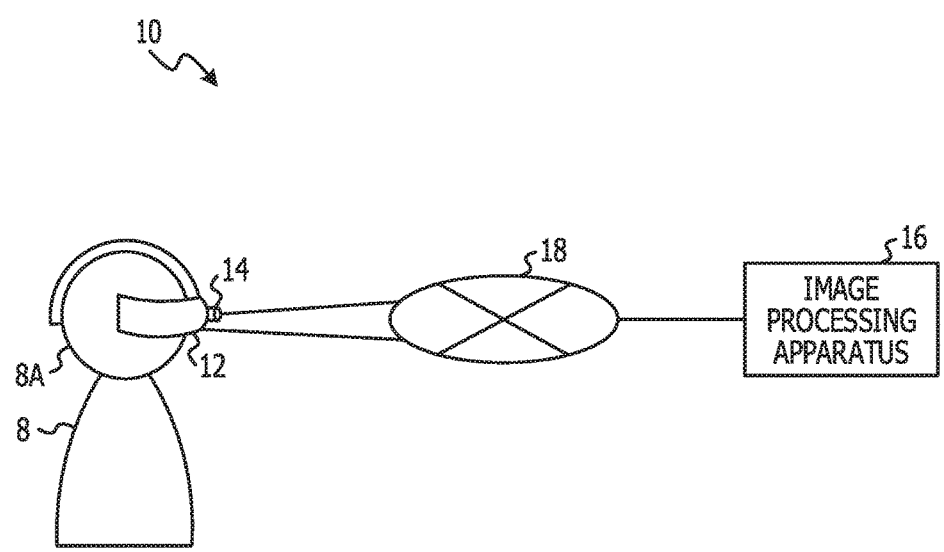
FIG. 1 is a diagram illustrating a schematic configuration of an image processing system according to a first embodiment.

FIG. 1 illustrates a schematic configuration diagram of an image processing system 10 according to a first embodiment. As illustrated in FIG. 1, the image processing system 10 of the present embodiment includes a head mounted display (HMD) 12, an image capturing device 14, and an image processing apparatus 16. In the image processing system 10 of the present embodiment, the image capturing device 14 is integrated with the HMD 12. In the image processing system 10 of the present embodiment, the HMD 12 and the image capturing device 14 are connected to the image processing apparatus 16 via a network 18.

In the image processing system 10 of the present embodiment, the HMD 12 is used as a display device, which is mountable on a head 8A of a user 8, and is disposed in front of an eye part of the user 8 when being mounted on the head 8A, as illustrated in FIG. 1. The image processing system 10 has a function of performing display referred to as augmented reality (AR). By this function, an image obtained by performing image processing in the image processing apparatus 16 is displayed while being superimposed on an image of a real space captured by the image capturing device 14.

Meanwhile, for example, there is a system that uses a tablet terminal, not an HMD, as a display device. This system allows a work instruction in field work at a worksite such as a factory to be provided via the tablet terminal. In this type of system, the user is assisted in the work by support information, which is superimposed on an image captured by the tablet terminal or the like, and displayed on a screen of the tablet terminal. However, in this system, since the user has to hold the tablet terminal by hand when checking the support information, the user may sometimes fail to view the support information when actually carrying out the work. In addition, when the user holds the tablet terminal, at least one hand of the user is occupied, and the user may take his/her eyes off an object that the user is working on, to check the support information displayed on the tablet terminal. For these and any other reasons, this system may reduce the efficiency in the actual work.

In contrast, when an HMD is used as a display device, a user is typically allowed to view information displayed on the HMD with his/her hands empty. Therefore, using the HMD allows information to be viewed in any place and situation, and thus, for example, improves work efficiency when some work is carried out.

However, although the HMD allows the user to view information with his/her hands empty, the HMD has a poor input interface in general. The input interface in the HMD is described below, by taking the above-mentioned assistance in the field work, as an example. In the field work, information that the user desires to check at a worksite is associated with an object of the work carried out at this worksite, in many cases.

For example, there is a case where, in maintenance and inspection work, meter reading is carried out by enlarging and displaying a small meter provided at a position difficult to approach, such as a meter attached to a ceiling or a device not easy to approach. There is also, for example, a case where, in digging a road in road repair, position confirmation is carried out by visually displaying a position of piping such as a water pipe and a gas pipe embedded in the ground, to avoid damage and accidents.

To implement application of the HMD to the field work, a user performs an operation of designating, for example, a meter that the user desires to enlarge and display, or a road area where the user desires to visually display piping, in the real world. In addition, the user performs an operation of specifying presentation of support information for the designated region. In this example, an enlarged displayed image of the meter, or a visually displayed image of the piping is presented as the support information.

However, operations using a dedicated controller accompanying the HMD may be complicated, and the user may have difficulty in performing these operations intuitively.

Therefore, there is a case where a user performs a gesture as an intuitive operation, and this gesture is recognized from an image captured by an image capturing device. However, it is difficult to implement an appropriate user interface. As an existing method using gestures, it is conceivable to apply region selection or enlargement operation used in a touch panel device to the HMD. In the touch panel device, a region is enlarged usually by pinch-in/pinch-out (increasing/decreasing the distance between a thumb and a forefinger). However, in the HMD, a gesture has to be performed in the air (without touching any object) unlike the touch panel device. Therefore, when the user moves fingers in a manner similar to the pinch-in/pinch-out, the fingers tend to make small movements similar to shaking, i.e., it is difficult to keep the fingers still, and thus, it is not easy to perform an operation properly.

In this way, the user may readily perform an operation when using the touch panel device or the like because the user performs the operation while touching a fixed object, whereas the user may have difficulty in performing an operation when performing the operation in the air.

A device on a side that recognizes an operation performed by a user using a gesture may also have difficulty in properly detecting small movements of fingers such as the pinch-in/pinch-out. For example, even if there is no change in the shape of a hand or a finger of the user, only a slight change in an angle between the hand of the user and a camera may cause the distance between fingers to look different to the camera. Therefore, it may be incorrectly determined that the pinch-in/pinch-out is performed. In addition, for example, in a case where a user wears an image capturing device provided to capture an image of a gesture of the user, misrecognition may occur due to movement of the image capturing device, even if the gesture is appropriately performed by the user.

Besides, for a user unfamiliar with a user interface, it may not be easy to perform an operation properly. For example, if a user uses a new user interface and the user is unfamiliar with this user interface, it is not easy for the user to perform an operation properly, even if this user interface is of an easy-to-operate type.

In contrast, when the HMD 12 is used, the image processing apparatus 16 of the image processing system 10 according to the present embodiment may appropriately recognize an intuitive operation of a user performed in the air, even if the user is unfamiliar with the operation.

In the image processing system 10 of the present embodiment, a video see-through type HMD, which displays an image captured by the image capturing device 14, is used as the HMD 12. The image capturing device 14 is a camera, and has a function of capturing an image of a view in front of the user 8. The image capturing device 14 captures a moving image, and sequentially transmits the captured moving image to the image processing apparatus 16. The moving image outputted from the image processing apparatus 16 is then displayed on the HMD 12. Any image that may be either "moving image" or "still image" is hereinafter referred to collectively as "image".

Figure 2:
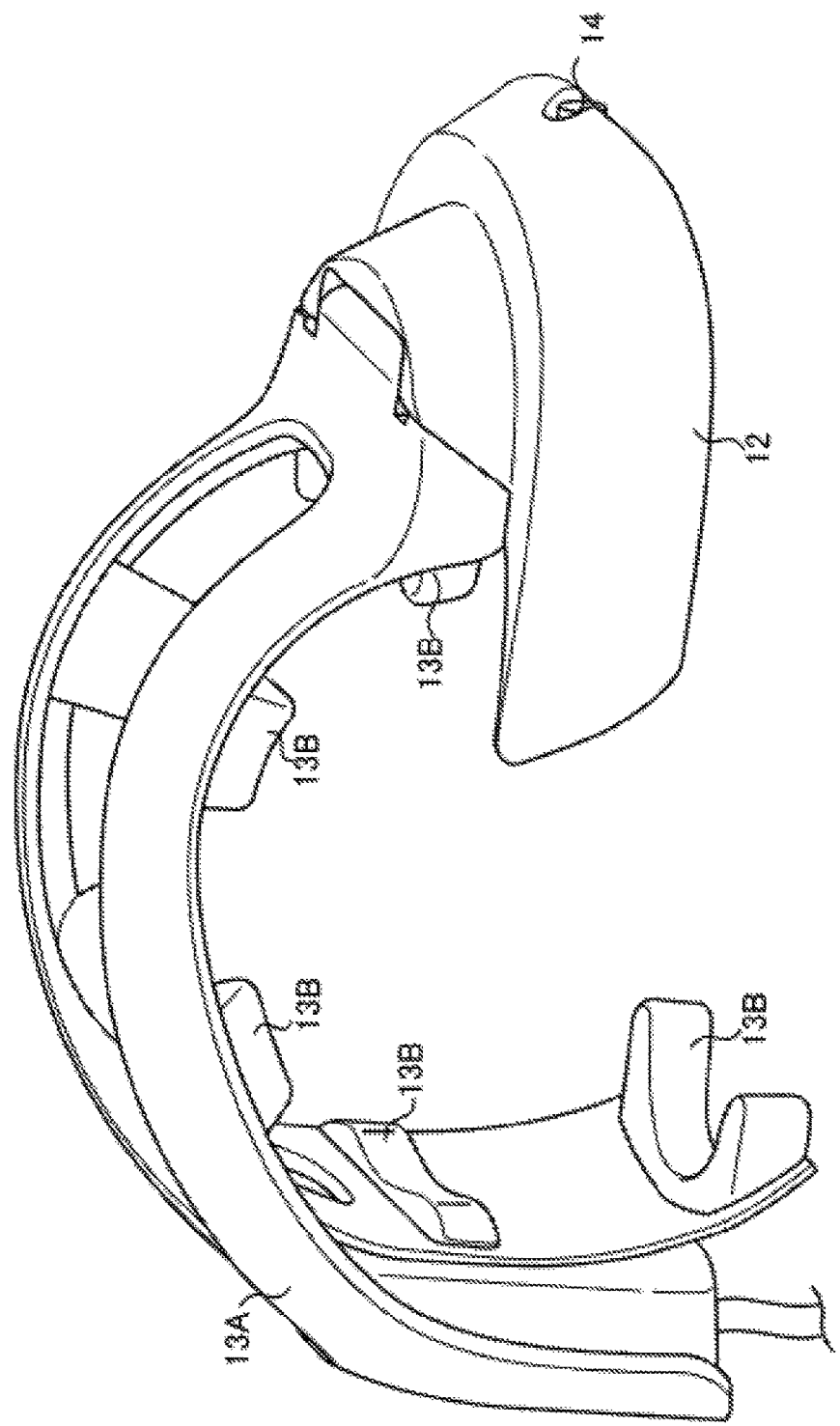
FIG. 2 is a diagram illustrating a specific example of a head mounted display (HMD) and an image capturing device according to the first embodiment.

FIG. 2 illustrates a specific example of each of the HMD 12 and the image capturing device 14 of the present embodiment. The HMD 12 of the present embodiment is attached to one end part of a base 13A curved to have an arc shape matching with the head 8A. On an internal circumferential surface of the base 13A, contact sections 13B are provided at an interval. When the contact sections 13B are in contact with the head 8A in a state where the base 13A is mounted on the head 8A of the user 8, the HMD 12 is disposed at a position facing the eye part of the user 8 with a space therebetween.

The image capturing device 14 is disposed at a position, which is in vicinity of a central part of the HMD 12 and corresponds to a part between both eyes of the user 8. The position where the image capturing device 14 is disposed is not limited to the position illustrated in FIG. 2. For example, the image capturing device 14 may be disposed at a position closer to either a right side or a left side of the head of the user 8, or may be disposed at a position in vicinity of a top part of the head 8A of the user 8. The image capturing device 14 may be separate from the HMD 12. However, the image capturing device 14 may be preferably at a position that allows capturing of an image similar to a field of view of the user.

Meanwhile, the image processing apparatus 16 recognizes an operation of the user 8 from the image captured by the image capturing device 14, and allows the HMD 12 to display an image (contents) resulting from image processing according to the operation of the user 8.

Figure 3:
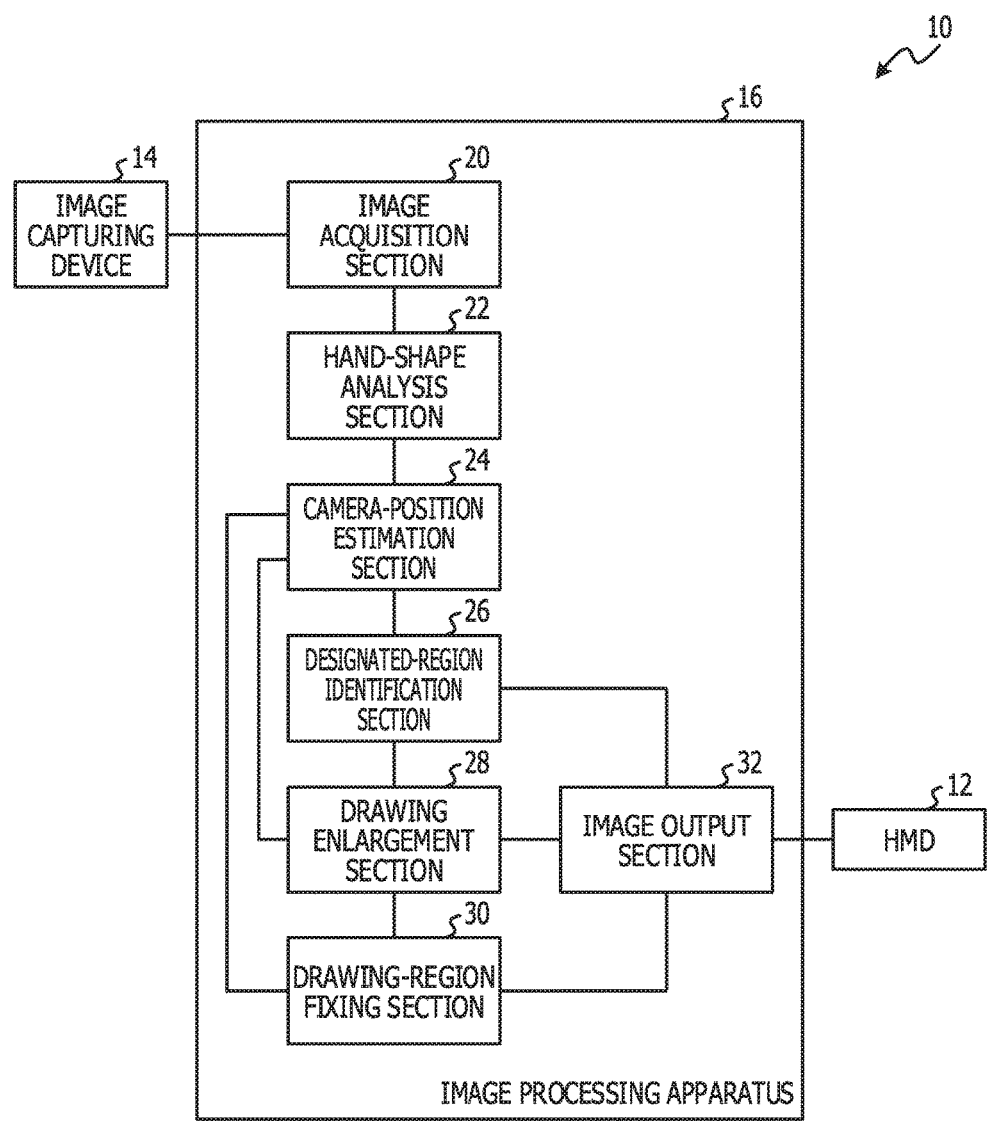
FIG. 3 is a functional block diagram illustrating a schematic configuration of an example of an image processing apparatus according to the first embodiment.

FIG. 3 is a functional block diagram illustrating a schematic configuration of an example of the image processing apparatus 16 according to the present embodiment.

As illustrated in FIG. 3, the image processing apparatus 16 of the present embodiment includes an image acquisition section 20, a hand-shape analysis section 22, a camera-position estimation section 24, a designated-region identification section 26, a drawing enlargement section 28, a drawing-region fixing section 30, and an image output section 32.

The image acquisition section 20 has a function of acquiring an image captured by the image capturing device 14. Further, the image acquisition section 20 of the present embodiment converts the acquired captured image (a moving image) to an image (a still image) of each frame.

The hand-shape analysis section 22 analyzes whether an image corresponding to a hand of the user 8 is included in the captured image that is the still image resulting from the conversion by the image acquisition section 20. In the present embodiment, a hand shape having a specific shape corresponding to the type of each operation of the user is predetermined, and the analysis is performed on whether a hand image (a hand region) having this specific shape is included in the captured image. A technique of analyzing whether the hand region having the specific shape is included in the captured image is not limited in particular. Applicable techniques include, for example, a technique discussed in a non-patent document 1: Raheja, J. L., Das, K., Chaudhary, a. "An Efficient Real Time Method of Fingertip Detection", *Proceedings of 7th International Conference on Trends in Industrial Measurements and Automation (TIMA 2011),* CSIR Complex, Chennai, India, pp. 447-450, 6-8 Jan., 2011.

The camera-position estimation section 24 estimates a position of the image capturing device 14. Generally, in AR using an HMD, the position of the image capturing device 14 is estimated, so that the display position of the generated contents is precisely aligned in real time with a specific location in a real space to match the position and the posture of the user 8. The function provided in the camera-position estimation section 24 to estimate the position of the image capturing device 14 is not limited in particular. For example, a marker (such as an AR marker) may be read, and alignment may be performed based on information obtained by this reading. As a specific example, there may be used a technique discussed in a non-patent document 2: Kato et al., "An Augmented Reality System and its Calibration Based on Marker Tracking", *Journal of the Virtual Reality Society of Japan*, 4 (4), pp. 607-616, December 1999.

The designated-region identification section 26 identifies a region designated by the user 8 based on an analysis result obtained by the hand-shape analysis section 22.

The drawing enlargement section 28 enlarges an image of the designated region identified by the designated-region identification section 26. Specifically, the drawing enlargement section 28 generates an image obtained by enlarging the image of the designated region in the captured image, as contents. To be more specific, the drawing enlargement section 28 generates the contents in a form suitable for a field of view of the image capturing device 14 by converting the designated region into a real-world coordinate system based on the camera position estimated by the camera-position estimation section 24. The generated contents are displayed by the HMD 12, while being superimposed on the image captured by the image capturing device 14.

In the present embodiment, reduction is assumed to be enlargement with a magnification of less than 1, and therefore, actual reduction is referred to as "enlargement" as well.

The drawing-region fixing section 30 fixes the designated region identified by the designated-region identification section 26, or the contents generated by the drawing enlargement section 28, by associating the designated region or the contents to coordinates in a real space.

The image output section 32 outputs an image including the contents generated by the designated-region identification section 26, the drawing enlargement section 28, and the drawing-region fixing section 30, to the HMD 12.

Figure 4:
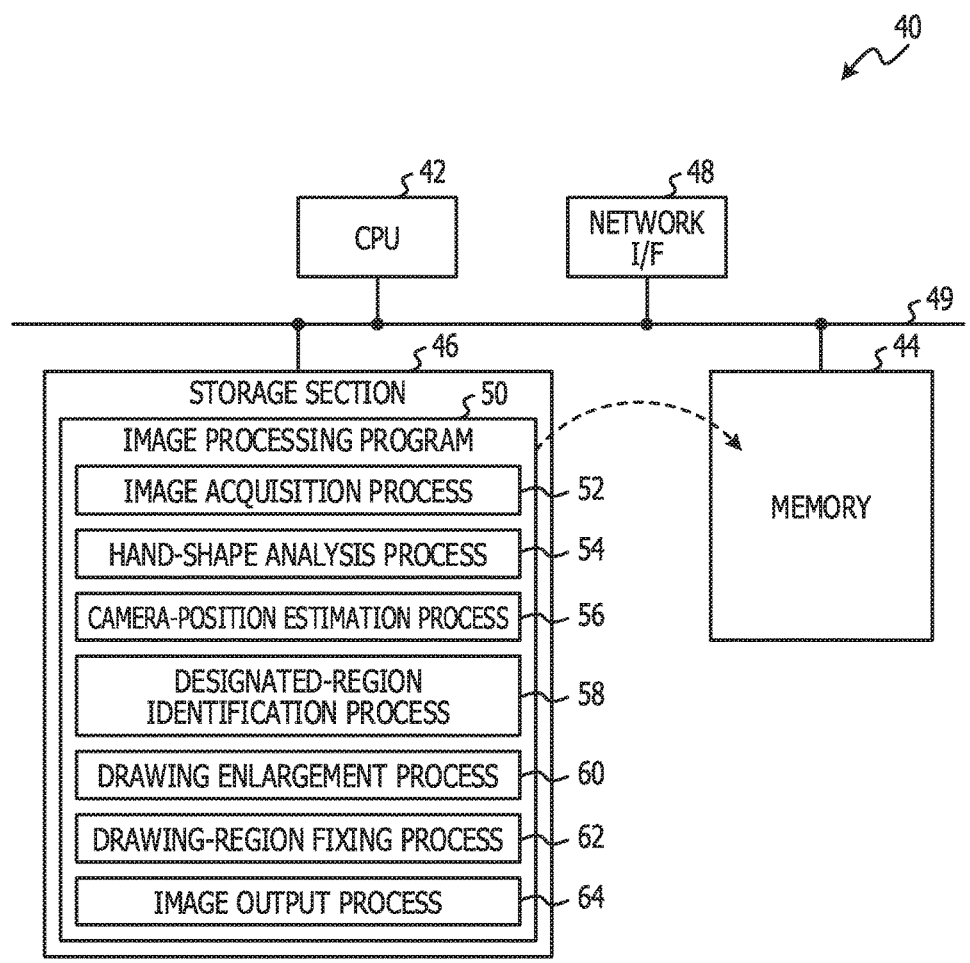
FIG. 4 is a block diagram illustrating a schematic configuration of a computer that serves as the image processing apparatus according to the first embodiment.

The image processing apparatus 16 may be implemented by, for example, a computer 40 illustrated in FIG. 4. To be more specific, the image processing apparatus 16 may be implemented by the computer 40 serving as a server. The computer 40 includes a central processing unit (CPU) 42, a memory 44, a non-volatile storage section 46, and a network I/F 48. The CPU 42, the memory 44, the storage section 46, and the network I/F 48 are interconnected via a bus 49. The network I/F 48 is connected to the network 18.

The storage section 46 may be implemented by a hard disk drive (HDD), a flash memory, or the like. The storage section 46 is provided as a storage medium, and stores an image processing program 50 that causes the computer 40 to serve as the image processing apparatus 16. The CPU 42 reads the image processing program 50 from the storage section 46, and develops the read image processing program 50 in the memory 44, thereby sequentially executing each process of the image processing program 50.

The image processing program 50 includes an image acquisition process 52, a hand-shape analysis process 54, a camera-position estimation process 56, a designated-region identification process 58, a drawing enlargement process 60, a drawing-region fixing process 62, an image output process 64, and a communication process 90.

The CPU 42 operates as the image acquisition section 20, by executing the image acquisition process 52. The CPU 42 also operates as the hand-shape analysis section 22, by executing the hand-shape analysis process 54. The CPU 42 also operates as the camera-position estimation section 24, by executing the camera-position estimation process 56. The CPU 42 also operates as the designated-region identification section 26, by executing the designated-region identification process 58. The CPU 42 also operates as the drawing enlargement section 28, by executing the drawing enlargement process 60. The CPU 42 also operates as the drawing-region fixing section 30, by executing the drawing-region fixing process 62. Further, the CPU 42 operates as the image output section 32, by executing the image output process 64.

The computer 40 executing the image processing program 50 thereby serves as the image processing apparatus 16.

The computer 40 is not limited to a desktop personal computer. The computer 40 may be other type of computer, such as a laptop personal computer, and a personal digital assistant (PDA) represented by a tablet terminal and a smartphone.

The image processing apparatus 16 may also be implemented by, for example, a semiconductor integrated circuit, more specifically, by an application specific integrated circuit (ASIC).

Figure 5:
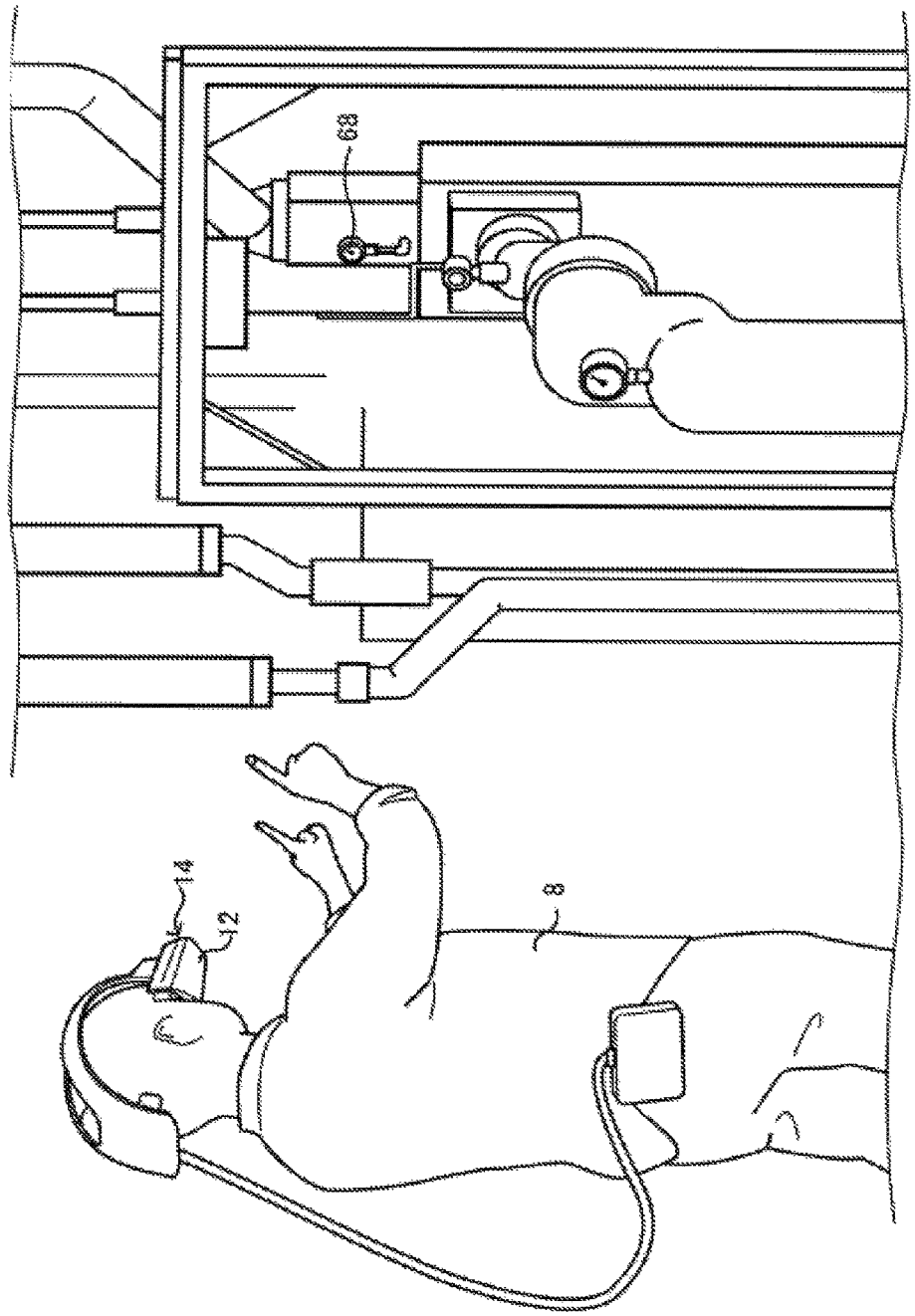
FIG. 5 is a diagram illustrating a case where a user reads a meter provided at a position away from the user in field work, as a specific example of the first embodiment.
Figure 6:
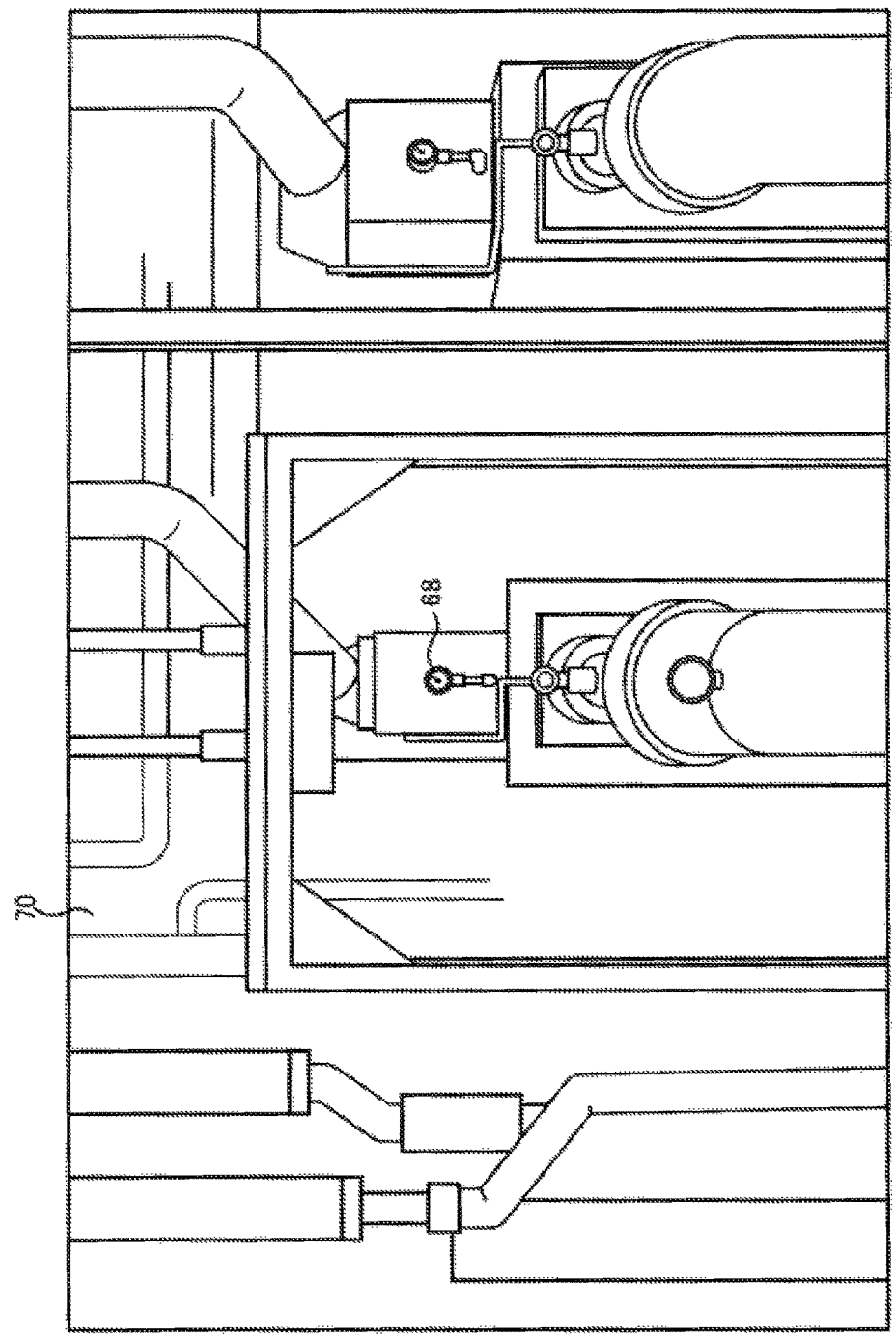
FIG. 6 is a diagram illustrating a specific example of an image captured by the image capturing device and displayed by the HMD according to the first embodiment.

Next, operation of the image processing system 10 according to the present embodiment is described. A case where reading is performed for a meter 68, which is provided at a position away from the user 8 in field work as illustrated in FIG. 5, is described below as a specific example. FIG. 6 illustrates a specific example of an image captured by the image capturing device 14 and displayed by the HMD 12.

Figure 7:
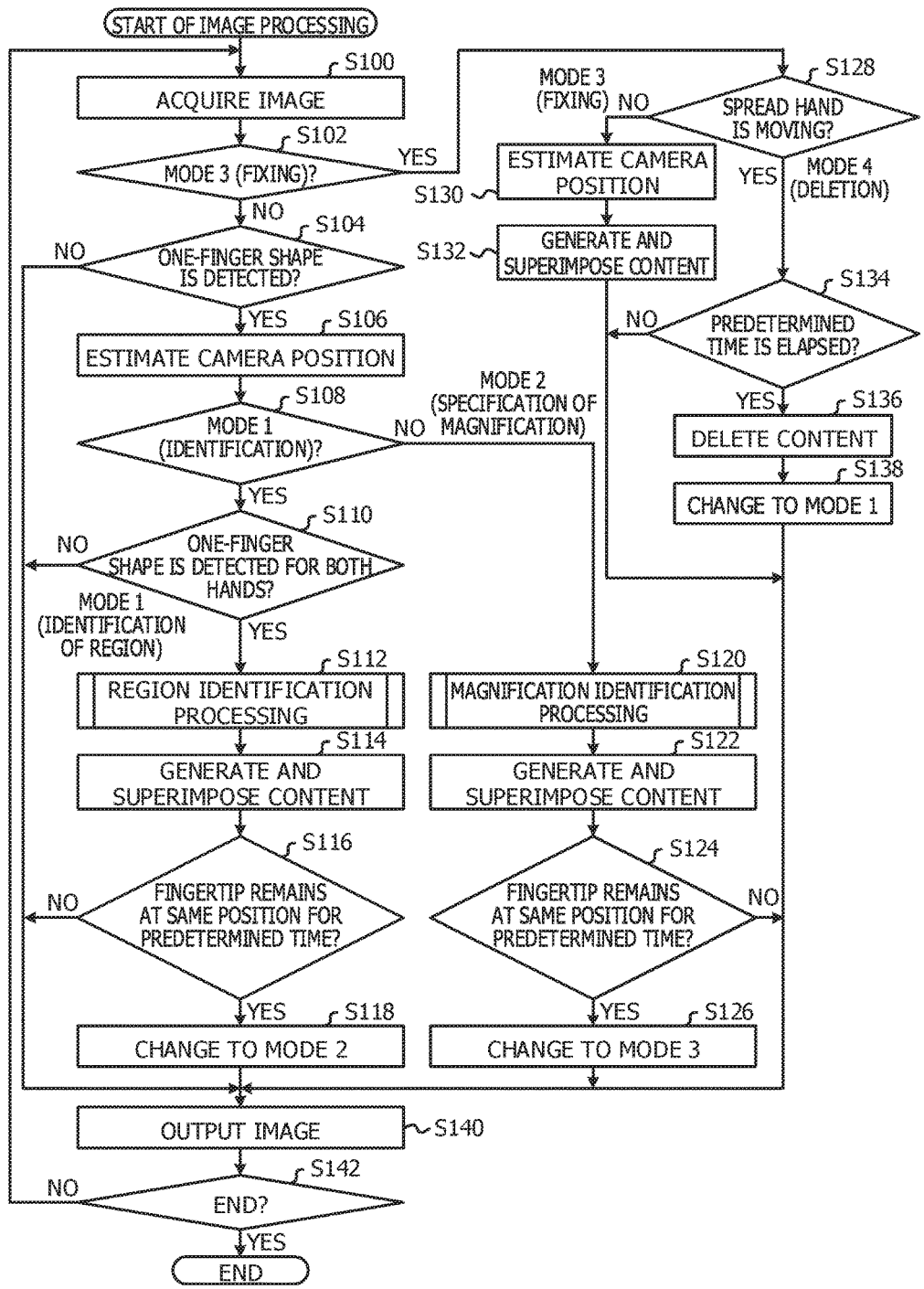
FIG. 7 is a flowchart of an example of image processing to be performed in the image processing apparatus according to the first embodiment.

FIG. 7 illustrates a flowchart of an example of image processing to be performed in the image processing apparatus 16. For example, the image processing illustrated in FIG. 7 is executed in a case where a captured image is transmitted from the image capturing device 14, when a power supply (not illustrated) of the HMD 12 is turned on.

The image processing to be performed in the image processing apparatus 16 of the present embodiment has modes corresponding to operations of the user 8. As specific examples, four modes are provided beforehand.

A mode 1 is a mode in which a region designated by the user 8 is identified. In the image processing system 10 of the present embodiment, in the mode 1, a shape, in which the user 8 extends only one finger (to be more specific, a forefinger) of both hands while bending the remaining fingers into the palm, is assumed to be a specific shape. When a hand image (a hand region) of both hands in the specific shape is detected, identification of a region begins. When the hand region remains at the same position for a predetermined time T1 or longer, the identification of the region is completed, and the inside of a circle having a diameter designated by a line connecting the tips of the extended fingers of both hands is identified as a designated region.

A mode 2 is a mode in which, when the user 8 performs an operation of specifying enlargement of an image of a designated region, an enlarged image of the designated region identified is generated as contents. In the mode 2, a magnification is specified according to a distance in which the user 8 moves one hand (to be more specific, the right hand) in a specific shape similar to that in the mode 1, in a specified direction.

For specifying a magnification, using one finger of both hands is not suitable, which is found by the inventors by experiment. Specifically, according to the results of the experiments involving a number of users, users have strong tendencies to expand their hands quickly and widely, when specifying a magnification by using one finger of both hands. The inventors have found that, even if a wide-angle camera (on the order of 130 degrees) is used, the fingers go outside an angle of view of the camera (it is difficult to determine a magnification). Therefore, in the image processing system 10 of the present embodiment, one finger of one hand is used to specify a magnification. This allows the user to specify a magnification easily, and the image processing apparatus 16 to detect the magnification reliably (without having situations such as fingers going outside from an angle of view).

A mode 3 is a mode in which a region designated by the user 8 or a position of contents displayed by the HMD 12 are fixed at a position in a real space.

A mode 4 is a mode in which the user 8 performs an operation of specifying deletion of contents displayed by the HMD 12. In the mode 4, a shape similar to a hand with a palm open is assumed to be a specific shape. Further, when a movement (to be more specific, a wave) of a hand region in the specific shape is detected, the displayed contents are deleted.

In the image processing apparatus 16, a setting section (not illustrated) is set at the mode 1, at the initial state when execution of the image processing begins.

In step S100, the image acquisition section 20 acquires an image of one frame resulting from conversion of a captured image, which is a moving image transmitted from the image capturing device 14, into an image (a still image) of each frame.

Next, in step S102, the hand-shape analysis section 22 determines whether the current mode is the mode 3. As described above, the mode 1 is set in the initial state and therefore, the determination results in a negative and the processing proceeds to step S104.

In step S104, the hand-shape analysis section 22 determines whether a hand region having a one-finger shape (a hand shape with one extended finger) is detected as a specific shape, in a captured image 70. The hand-shape analysis section 22 determines whether a hand region having the one-finger shape is detected from the captured image 70, irrespective of both hands or one hand.

Figure 8:
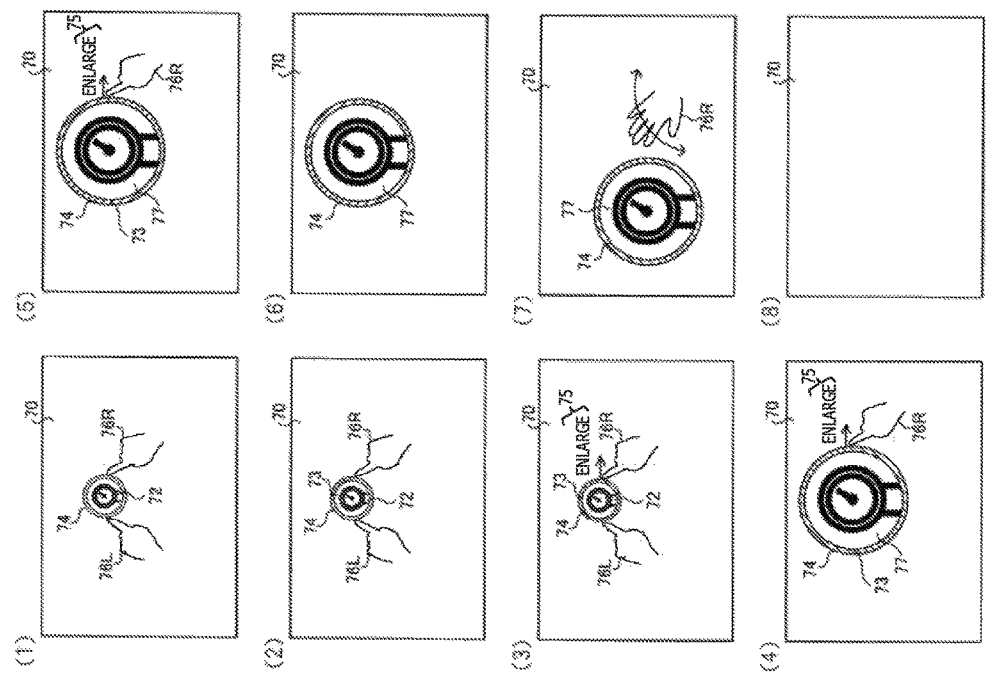
FIG. 8 is a diagram for describing an operation of the user and an image displayed by the HMD in the image processing system according to the first embodiment.

Part (1) of FIG. 8 illustrates a specific example of the captured image 70 displayed by the HMD 12, when the user 8 designates a region with one finger of both hands. The captured image 70 includes a hand region 76R in the one-finger shape of the right hand of the user 8 and a hand region 76L in the one-finger shape of the left hand. Therefore, the hand-shape analysis section 22 detects the one-finger shapes of both hands from the captured image 70.

When the hand-shape analysis section 22 detects no one-finger shape, the determination results in a negative, and the processing proceeds to step S140. In this case, in step S140, the image output section 32 outputs the captured image 70 as-is to the HMD 12. Therefore, the HMD 12 displays only the captured image 70 as-is, as illustrated in FIG. 6.

On the other hand, when the one-finger shape is detected, the determination in step S104 results in a positive, and the processing proceeds to step S106. In step S106, the camera-position estimation section 24 estimates the position of the image capturing device 14 in the manner described above.

Next, in step S108, the camera-position estimation section 24 determines whether the current mode is the mode 1. As described above, the mode 1 is set in the initial state and therefore, the determination results in a positive, and the processing proceeds to step S110.

Next, in step S110, the designated-region identification section 26 determines whether the one-finger shape detected by the hand-shape analysis section 22 corresponds to the one finger of both hands. When the detected one-finger shape does not correspond to both hands, the determination results in a negative, and the processing proceeds to step S140. On the other hand, when the detected one-finger shape corresponds to both hands, the determination results in a positive, and the processing proceeds to step S112.

When the current mode is the mode 1, and the one-finger shapes of both hands are detected, the designated-region identification section 26 performs region identification processing in step S112 to perform image processing corresponding to the mode 1.

Figure 9:
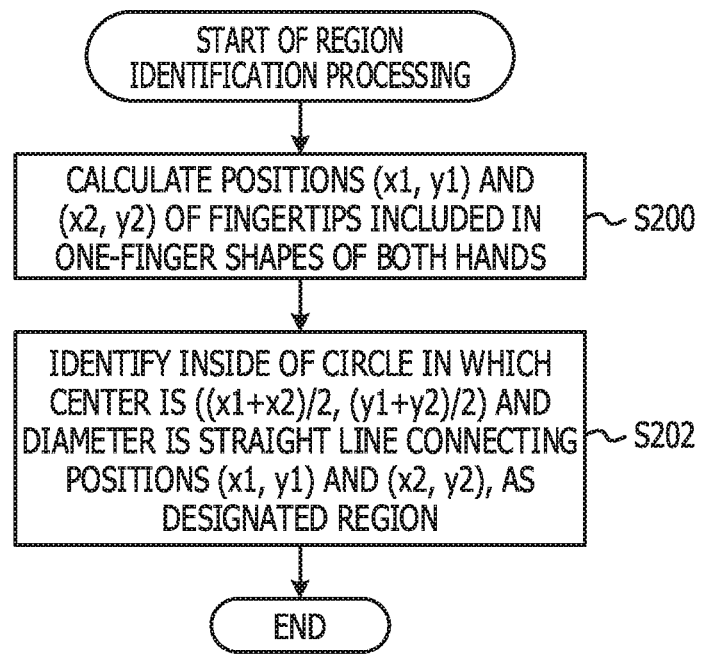
FIG. 9 is a flowchart of an example of region identification processing to be executed in a designated-region identification section according to the first embodiment.

FIG. 9 illustrates a flowchart of an example of the region identification processing to be executed in the designated-region identification section 26 of the present embodiment.

In step S200, the designated-region identification section 26 calculates positions (x1, y1) and (x2, y2) of the respective fingertips included in the one-finger shapes of both hands.

Next, in step S202, the designated-region identification section 26 identifies the inside of a circle, in which the center is ((x1+x2)/2, (y1+y2)/2) and the diameter is a straight line connecting the positions (x1, y1) and (x2, y2), as a designated region. The designated-region identification section 26 then ends the present processing.

The position, shape, and size of the designated region are each described above only as an example, and are not limitative.

The specific example illustrated in Part (1) of FIG. 8 represents a state where a circle image 74 representing a designated region is generated as contents, and superimposed on the captured image 70. Further, an image 72 of the designated region is comparable to the captured image 70.

A specific example illustrated in Part (2) of FIG. 8 represents a state where an indicator image 73 is further superimposed on the captured image 70. The indicator image 73 indicates a measured time for which the coordinates of the position of each of the fingertips remain the same. In the present specification, a position falling within a tolerance, which is set in consideration of fluctuations of the position of a fingertip resulting from an attempt to freeze a finger, is referred to as "the same position". As described below in the following step, when the time for which the coordinates of the position of each of the fingertips remain the same becomes equal to the predetermined time T1, the designated-region identification section 26 of the present embodiment completes identification of a designated region that the user 8 desires to enlarge and display. Therefore, the time for which the coordinates of the position of each of the fingertips remain the same is measured, and the indicator image 73 corresponding to the measured time is thus superimposed on the captured image 70. This allows the user 8 to recognize a time elapsed after the fingertips are each fixed at a position, and a time for which the fingertips have to be kept still (a remaining time for keeping the position unchanged).

Next, in step S114, the designated-region identification section 26 generates contents corresponding to the designated region, and superimposes the contests on the captured image 70.

Next, in step S116, the designated-region identification section 26 determines whether the positions of the fingertips included in the one-finger shapes of both hands remain the same for the predetermined time T1, as described above in the previous step. Specifically, the designated-region identification section 26 measures a time for which the coordinates of the position of each of the fingertips remain the same. A method for this measurement is not limited in particular, and the measurement may be performed using, for example, a counter (not illustrated), or may be performed based on the number of frames of the captured image 70 in which the coordinates of the position of each of the fingertips remain the same.

When a movement of the fingertips occurs (falls outside the above-described tolerance) before the predetermined time T1 elapses, the determination results in a negative, and the processing proceeds to step S140. In this case, in step S140, as in the specific examples illustrated in Part (1) and Part (2) of FIG. 8, the image output section 32 outputs an image, in which the circle image 74 representing the region designated by the user 8 and the circle image 74 with the indicator image 73 are superimposed on the captured image 70, to the HMD 12.

On the other hand, when the positions of the fingertips remain the same for the predetermined time T1, the determination results in a positive and the processing proceeds to step S118.

In this case, the identification of the designated region that the user 8 desires to enlarge and display is completed, and the image processing corresponding to the mode 1 ends. Therefore, in step S118, the drawing-region fixing section 30 changes the mode of the image processing to the mode 2, and then the processing proceeds to step S140. In changing to the mode 2, the position (as a specific example, a central position) of the identified designated region is fixed. Therefore, afterward, even if the user 8 moves both hands, the designated region remains fixed at the position determined by the designated-region identification section 26, until the user 8 resumes the processing.

In this case, in step S140, the image output section 32 outputs an image, in which the indicator image 73 representing a lapse of the predetermined time T1 is superimposed on the captured image 70, to the HMD 12.

On the other hand, when the current mode is determined not to be the mode 1 in step S108, the processing proceeds to step S120. In the present embodiment, after setting is changed to the mode 2 in step S118, the processing proceeds to step S120.

In step S120, the drawing enlargement section 28 performs magnification identification processing.

Figure 10:
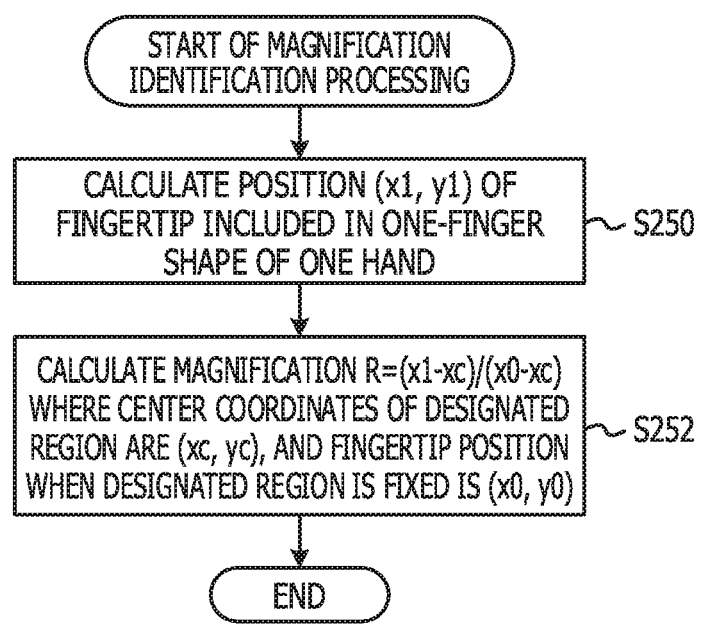
FIG. 10 is a flowchart of an example of magnification identification processing to be executed in a drawing enlargement section according to the first embodiment.

FIG. 10 illustrates a flowchart of an example of the magnification identification processing to be executed in the drawing enlargement section 28 of the present embodiment.

In step S250, the drawing enlargement section 28 calculates the position (x1, y1) of the fingertip included in the one-finger shape of one hand. In the image processing apparatus 16 of the present embodiment, specifying a magnification with the right hand, is determined beforehand as a specific example. Therefore, after designating a region, the user 8 may subsequently specify a magnification, by moving the right hand in a predetermined direction while keeping the right hand in the same shape (the hand shape with one extended finger).

Next, in step S252, the drawing enlargement section 28 calculates a magnification R based on the following expression (1), where the coordinates of the center of the designated region is assumed to be (xc, yc), and the position of the fingertip in the hand region when the designated region is fixed is assumed to be (x0, y0). The drawing enlargement section 28 then ends the present processing.

$$R=(x1-xc)/(x0-xc) \qquad (1)$$

The magnification is thus calculated by the drawing enlargement section 28. Next, in step S122, the drawing enlargement section 28 generates contents corresponding to the magnification, and superimposes the contents on the captured image 70. To provide a user with information representing a predetermined direction for moving a finger (a hand) in specifying a magnification, the drawing enlargement section 28 of the present embodiment generates contents representing an enlargement direction, and superimposes the contents on the captured image 70. Further, as for an image corresponding to the designated region, an image enlarged according to the magnification calculated in the above-described step is generated as contents instead of using the captured image 70 as-is.

A specific example illustrated in Part (3) of FIG. 8 represents the image generated in step S122 executed immediately after changing to the mode 2, and then displayed on the HMD 12. As illustrated in Part (3) of FIG. 8, information 75 indicating the above-described predetermined direction is further superimposed on the captured image 70.

A specific example illustrated in Part (4) of FIG. 8 represents a state where an enlarged image 77 resulting from enlargement according to the magnification specified by the user 8 is superimposed on the captured image 70.

A specific example illustrated in Part (5) of FIG. 8 represents a state where the indicator image 73 is further superimposed on the captured image 70. The indicator image 73 indicates a measured time for which the coordinates of the position of the fingertip remain the same. As will be described below in the following step, when the time for which the coordinates of the position of the fingertip remain the same becomes equal to a predetermined time T2, the drawing enlargement section 28 of the present embodiment completes specifying the magnification by the user 8. Therefore, the time for which the coordinates of the position of the fingertip remain the same is measured, and the indicator image 73 is displayed according to the measured time. The indicator image 73 may be displayed, for example, with a color different from a color used when the region is designated by the user 8. This allows the user 8 to recognize a time elapsed after the fingertip is fixed at a position, and a time for which the fingertip has to be kept still (a remaining time for keeping the position unchanged).

Next, in step S124, the drawing enlargement section 28 determines whether the position of the fingertip included in the one-finger shape of one hand remains the same for the predetermined time T2. Specifically, the drawing enlargement section 28 measures a time for which the coordinates of the position of the fingertip remain the same, in a manner similar to step S116 described above. The predetermined time T2 may be the same as or may be different from the predetermined time T1.

When the position of the fingertip does not remain the same for the predetermined time T2, the determination results in a negative, and the processing proceeds to step S140.

On the other hand, when the position of the fingertip remains the same for the predetermined time T2, the determination results in a positive and the processing proceeds to step S126.

In this case, specifying the magnification by the user 8 is completed, and the image processing corresponding to the mode 2 ends. Therefore, in step S126, the drawing-region fixing section 30 changes the mode of the image processing to the mode 3, and then the processing proceeds to step S140. In changing to the mode 3, the position (a position in the real world) of the enlarged image 77 is fixed. Therefore, afterward, even if the user 8 moves one or both hands, the enlarged image 77 is fixed at the position in the real world, until the user 8 resumes the processing.

Part (6) of FIG. 8 illustrates a specific example of an image displayed on the HMD 12 after changing to the mode 3. As illustrated in Part (6) of FIG. 8, even if the user 8 moves the hand, the enlarged image 77 is displayed in a state of being fixed at the position in the real world.

In the image processing apparatus 16 of the present embodiment, when the user 8 keeps the right finger (hand) still, after the mode 1 changes to the mode 2 upon ending, the enlarged image 77 is generated under a magnification of 1. In other words, the enlarged image 77 similar to the captured image 70 is superimposed at the fixed position of the captured image 70.

On the other hand, when the determination results in a positive in step S102, the processing proceeds to step S128. After changing to the mode 3 as described above, the determination results in a positive, and therefore, the processing proceeds to step S128.

In step S128, the hand-shape analysis section 22 determines whether a moving (waving) state of a hand region having a spread-hand (with fingers open) shape serving as a specific shape is detected in the captured image 70. Specifically, the hand-shape analysis section 22 determines whether a hand region having a hand-waving state of either left or right hand is detected from the captured image 70. The hand-shape analysis section 22 of the present embodiment detects a change in the position of a hand region in consecutive frames to determine whether there is such a movement.

Part (7) of FIG. 8 illustrates a specific example of the captured image 70 displayed on the HMD 12 when the user 8 moves a spread hand to specify deletion of the enlarged image 77. The captured image 70 includes the hand region 76R of the right spread-hand of the user 8 and the enlarged image 77. Therefore, the hand-shape analysis section 22 detects a spread-hand moving in the captured image 70.

When there is no movement of a spread hand, the determination results in a negative, and the processing proceeds to step S130. In step S130, the camera-position estimation section 24 estimates the position of the image capturing device 14 in the manner described above.

Next, in step S132, the drawing-region fixing section 30 superimposes the enlarged image 77 at a position corresponding to the real space in the captured image 70 where the enlarged image 77 is fixed in step S126 described above, and then the processing proceeds to step S140. In step S140, the image output section 32 outputs an image in which the enlarged image 77 is superimposed at the position corresponding to the real space in the captured image 70, to the HMD 12.

In this state, if any action by the user, such as moving his/her face, causes the position at which the enlarged image 77 is fixed in the real space to go outside a field of view (an imaging range of the image capturing device 14) of the user 8, the enlarged image 77 temporarily disappears from the captured image 70 displayed on the HMD 12. Afterward, when the position at which the enlarged image 77 is fixed in the real space enters the field of view of the user 8, the enlarged image 77 appears again at this position.

On the other hand, when the determination results in a positive in step S128, the processing proceeds to step S134.

In step S134, the drawing-region fixing section 30 determines whether the state of the user 8 moving the spread hand continues for a predetermined time T3. Specifically, the drawing-region fixing section 30 measures a time for which the coordinates of the position of the spread-hand shape continuously changes, in a manner similar to step S116 described above. The predetermined time T3 may be the same as or may be different from the predetermined time T1 and time T2 described above.

When there is no continued movement of the spread hand for the predetermined time T3, the determination results in a negative, and the processing proceeds to step S140.

On the other hand, when the movement of the spread hand continues during the predetermined time T3, the determination results in a positive, and the processing proceeds to step S136.

In this case, deletion of the enlarged image 77 is specified by the user 8. Therefore, in step S136, the drawing-region fixing section 30 deletes all the contents that are displayed after being generated and superimposed, including the enlarged image 77.

A specific example illustrated in Part (8) of FIG. 8 represents a state where all the displayed contents including the enlarged image 77 are deleted. In this case, the HMD 12 displays the captured image 70 as-is.

Next, in step S138, the drawing-region fixing section 30 changes the mode of the image processing to the mode 1, and then the processing proceeds to step S140.

In step S140, the image output section 32 outputs the captured image 70 itself, or the captured image 70 on which the generated contents are superimposed as described above, to the HMD 12.

Next, in step S142, the image acquisition section 20 determines whether to end this image processing. If the image processing is not to be ended, the processing returns to step S100, and this image processing is performed again for the image of the next frame.

As described above, according to the image processing apparatus 16 of the present embodiment, the operation recognized by the image processing apparatus 16 is an operation that is intuitively understood as an operation to specify execution of predetermined image processing for a region designated by the user 8 in the air. Therefore, even if the user is unfamiliar with operations, the image processing apparatus 16 allows the user to perform an operation easily and properly, so that a recognition rate for the operation improves.

[Second Embodiment]

Figure 11:
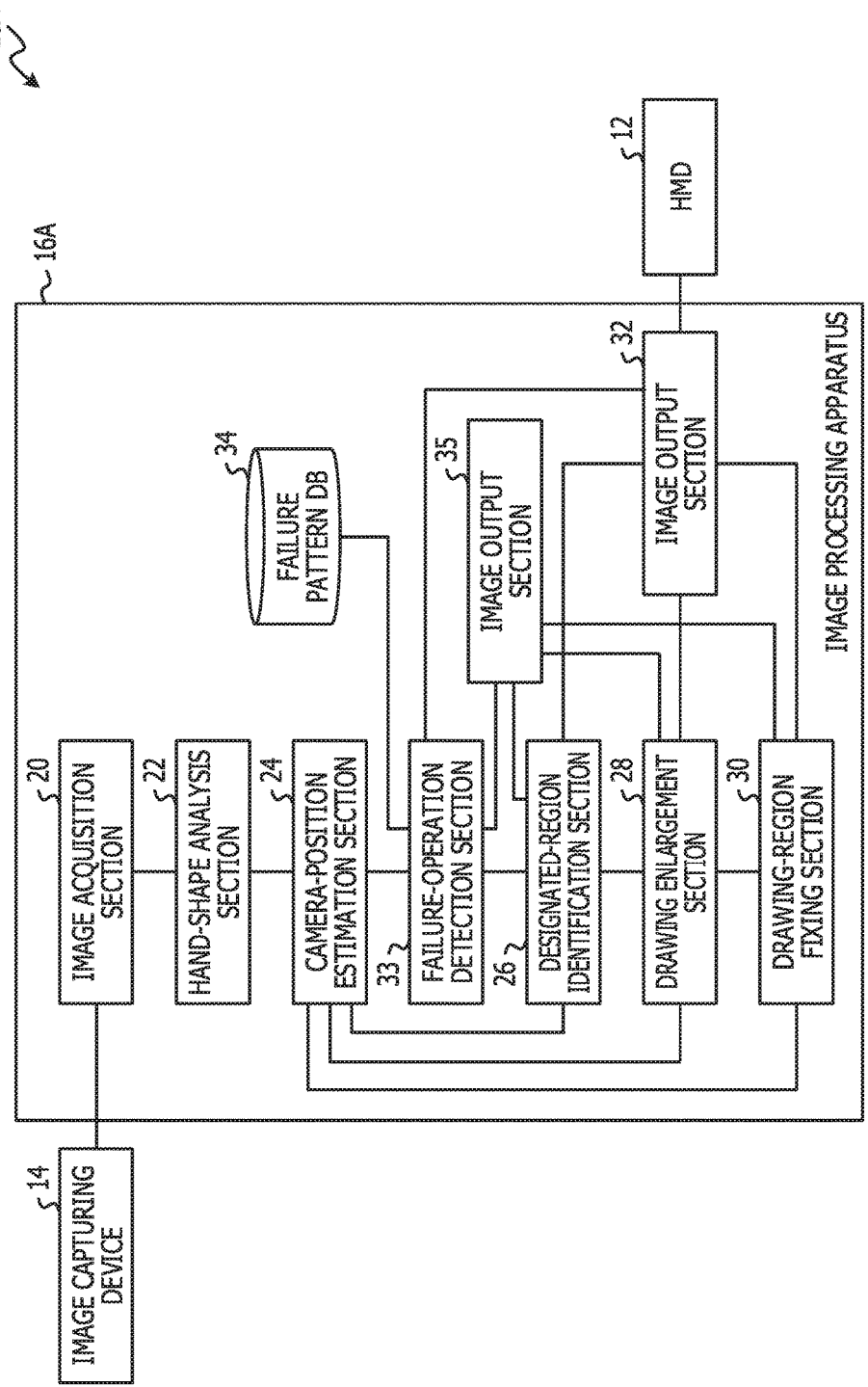
FIG. 11 is a functional block diagram illustrating a schematic configuration of an example of an image processing apparatus according to a second embodiment.

FIG. 11 is a functional block diagram illustrating a schematic configuration of an example of an image processing apparatus according to a second embodiment.

The image processing apparatus 16 of the first embodiment detects an operation intuitively performed by the user 8 from the captured image 70 captured by the image capturing device 14, thereby recognizing the operation performed by the user 8. As described above, the user 8 has to perform a gesture in the air. In addition, the image processing apparatus 16 recognizes the operation, from the captured image 70 captured by the image capturing device 14. Therefore, the image processing apparatus 16 may detect a gesture (a movement) different from an operation intended by the user 8, when the user 8 is unfamiliar with the operation (gesture).

Therefore, an image processing system 10A (an image processing apparatus 16A) of the present embodiment determines an operation intended by the user 8, and performs processing according to the determined operation, even if the user 8 performs a gesture different from the intended operation.

To this end, the image processing apparatus 16A of the present embodiment further includes a failure-operation detection section 33, a failure pattern database (DB) 34, and an operation-intention determination section 35, which is a different point from the image processing apparatus 16 of the first embodiment. The failure pattern DB 34 may not be limited to a database included in the image processing apparatus 16A, and another database provided in a device outside the image processing apparatus 16A may be used.

Based on a failure pattern stored in the failure pattern DB 34, the failure-operation detection section 33 detects whether a movement of the user 8 detected from the captured image 70 is a failure of a predetermined operation.

The failure pattern DB 34 of the present embodiment stores a failure pattern obtained by computerizing a conceivable failure operation for each of the various predetermined operations of the user 8 described in the first embodiment.

In the present embodiment, three specific examples are each described as an example of a case where a user fails to perform a predetermined operation. A predetermined operation attempted by the user 8 may result in an operation that the image processing apparatus 16 fails to recognize in normal processing (the image processing described in the first embodiment). Such an operation is referred to below as "failure operation". Three failure operations (failure operations 1 to 3) are each described below as a specific example. It goes without saying that when predetermined operations vary, conceivable failure operations vary accordingly, and therefore, the failure operation is not limited to the failure operations 1 to 3.

The failure operation 1 is an example of the failure operation conceivable for the designation operation performed by the user 8 to designate a region. The failure operation 1 is a case where, when performing the designation operation, the user 8 tilts the one finger more than assumed in the one-finger shape serving as the specific shape and the finger trembles. In this case, the fingertip may appear and disappear in the captured image 70, so that detection of the fingertip is unstable.

The failure operation 2 is an example of the failure operation conceivable for the designation operation of fixing a designated region that the user 8 desires to enlarge. The failure operation 2 is a case where, when performing the designation operation, the user 8 moves the fingertip before the predetermined time T1 elapses, and therefore, identification of the designated region to be enlarged and displayed is not completed, making it difficult to cause a change to the mode 2.

The failure operation 3 is an example of the failure operation conceivable for the specification operation performed by the user 8 to specify a magnification of a designated region. The failure operation 3 is a case where the hand of the user 8 is lowered, so that the specification operation stops in midstream. As described in the first embodiment, the user 8 moves the finger of the right hand laterally in a rightward direction (in a direction that may be regarded as being horizontal, including a tolerance) to specify a magnification. However, when the hand of the user 8 is lowered, accurate recognition is difficult. Besides, since the operation stops in midstream, the magnification is fixed at a low level.

The failure pattern DB 34 of the image processing apparatus 16A in the present embodiment stores the failure pattern obtained by computerizing each of the failure operations 1 to 3. Specifically, the failure pattern expresses the failure operation (movement) of the user 8 by using the position of the fingertip of a hand region, and a trajectory of the position of the barycenter of a hand region.

The operation-intention determination section 35 determines an operation intended by the user 8 according to a failure pattern detected by the failure-operation detection section 33. Further, the operation-intention determination section 35 of the present embodiment presents an appropriate operation procedure for the determined operation.

Figure 12:
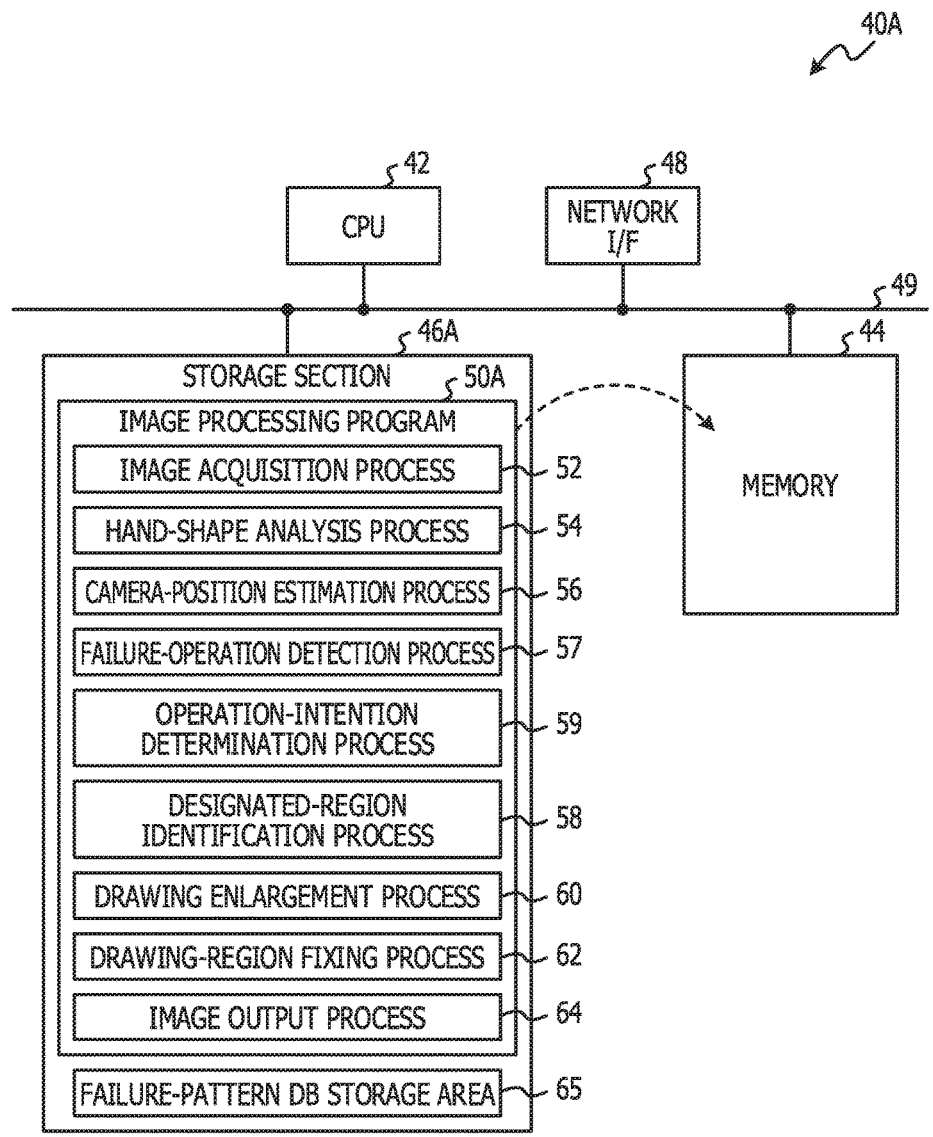
FIG. 12 is a block diagram illustrating a schematic configuration of a computer that serves as the image processing apparatus according to the second embodiment.

Further, the image processing apparatus 16A may be implemented, for example, by a computer 40A illustrated in FIG. 12. To be more specific, the image processing apparatus 16A may be implemented by the computer 40A serving as a server. The computer 40A includes a storage section 46A in place of the storage section 46 of the computer 40 of the first embodiment.

The storage section 46A stores an image processing program 50A that causes the computer 40A to serve as the image processing apparatus 16A. The image processing program 50A includes, in addition to each process of the image processing program 50 of the first embodiment, a failure-operation detection process 57 and an operation-intention determination process 59.

The CPU 42 operates as the failure-operation detection section 33 by executing the failure-operation detection process 57. The CPU 42 also operates as the operation-intention determination section 35 by executing the operation-intention determination process 59.

Further, a failure-pattern DB storage area 65 of the storage section 46A serves as a storage area where the failure pattern DB 34 is stored.

The computer 40A executing the image processing program 50A thereby serves as the image processing apparatus 16A.

Figure 13:
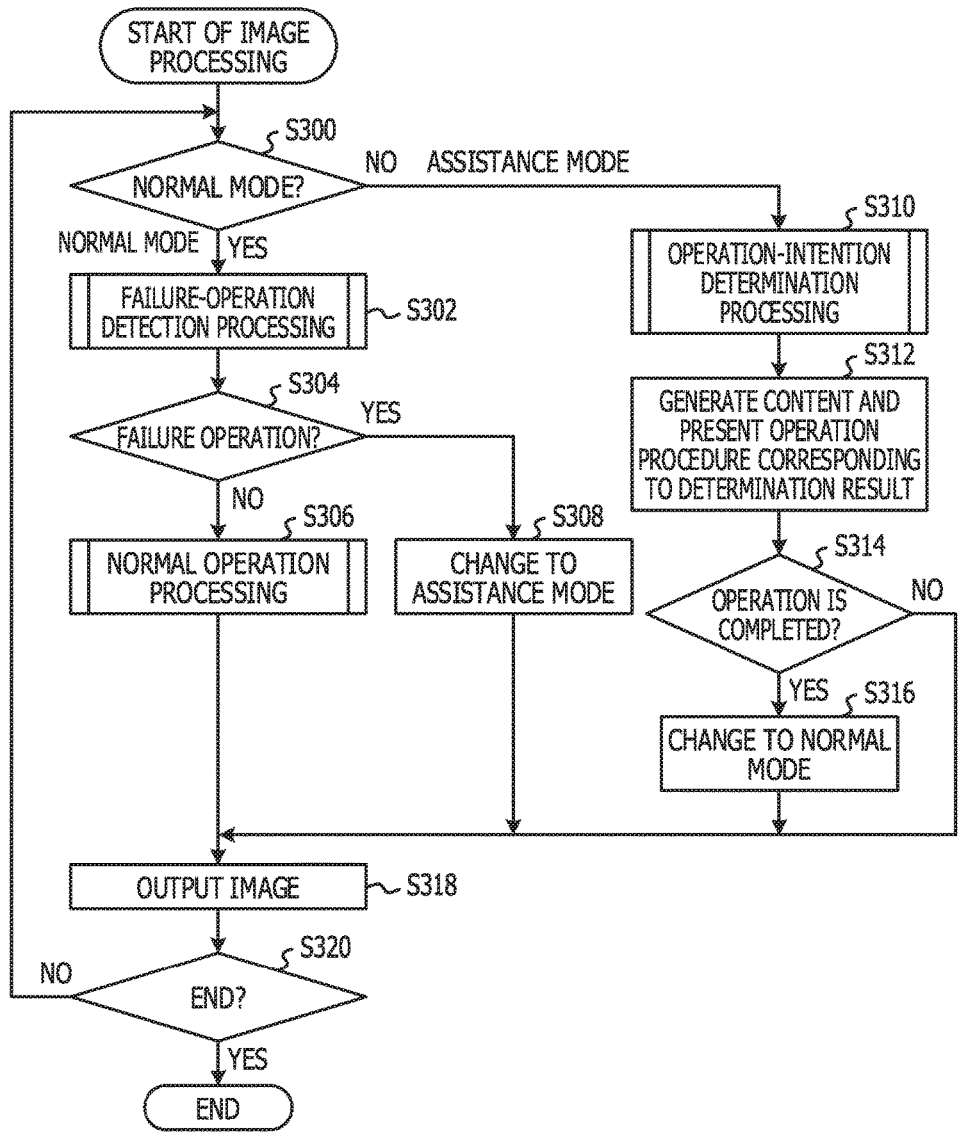
FIG. 13 is a flowchart of an example of image processing to be performed in the image processing apparatus according to the second embodiment.

Next, operation of the image processing system 10A according to the present embodiment is described. FIG. 13 illustrates a flowchart of an example of image processing to be performed in the image processing apparatus 16A. The image processing to be performed in the image processing apparatus 16A of the present embodiment includes processing similar to the processing (see FIG. 7) performed in the image processing apparatus 16 of the first embodiment, and therefore is not described in detail.

Next, in step S300, the failure-operation detection section 33 determines whether the current mode is a normal mode. In the image processing apparatus 16A of the present embodiment, the normal mode is set in the initial state. Further, in the image processing apparatus 16A, when the failure-operation detection section 33 detects a failure operation, setting is changed to an assistance mode to assist the user 8 in performing an operation.

When the normal mode is set, the determination results in a positive in step S300, and the processing proceeds to step S302.

Figure 14:
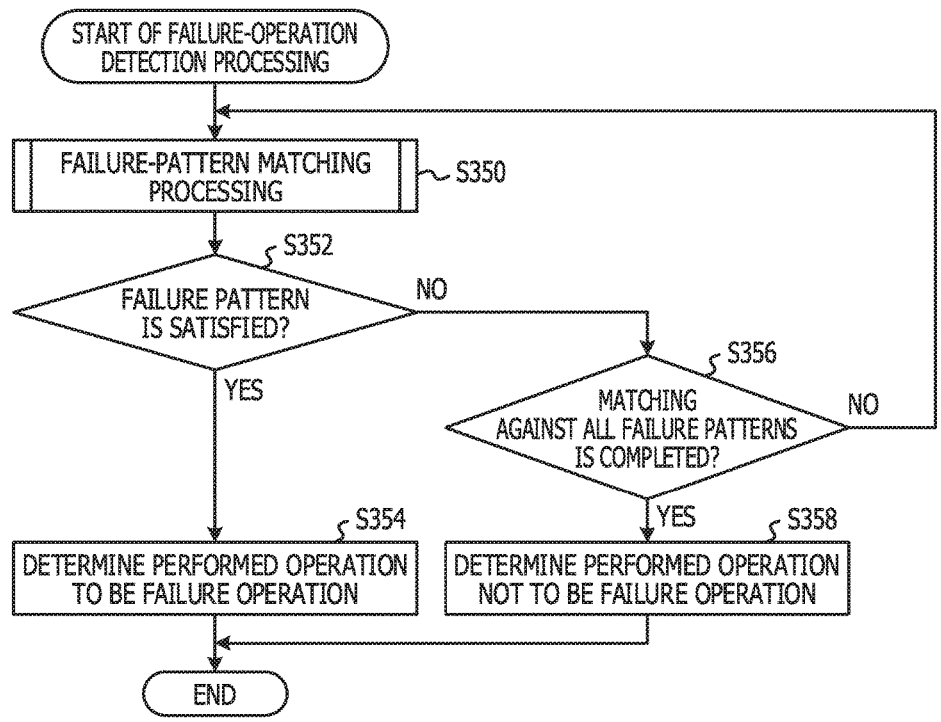
FIG. 14 is a flowchart of an example of failure-operation detection processing to be performed in a failure-operation detection section according to the second embodiment.

In step S302, the failure-operation detection section 33 performs failure-operation detection processing. FIG. 14 illustrates a flowchart of an example of the failure-operation detection processing to be performed in the failure-operation detection section 33.

The failure-operation detection section 33 of the present embodiment detects a failure operation based on the captured image 70 with a predetermined number of the latest frames. The predetermined number of frames is not limited in particular, but it is desirable to use a value obtained by experiment beforehand based on results of operations performed by users.

In step S350, the failure-operation detection section 33 performs failure-pattern matching processing. The failure-operation detection section 33 selects one of the failure patterns stored in the failure pattern DB 34, and matches a movement and a hand region of the user 8 detected from the captured image 70, against this selected failure pattern.

Figure 15:
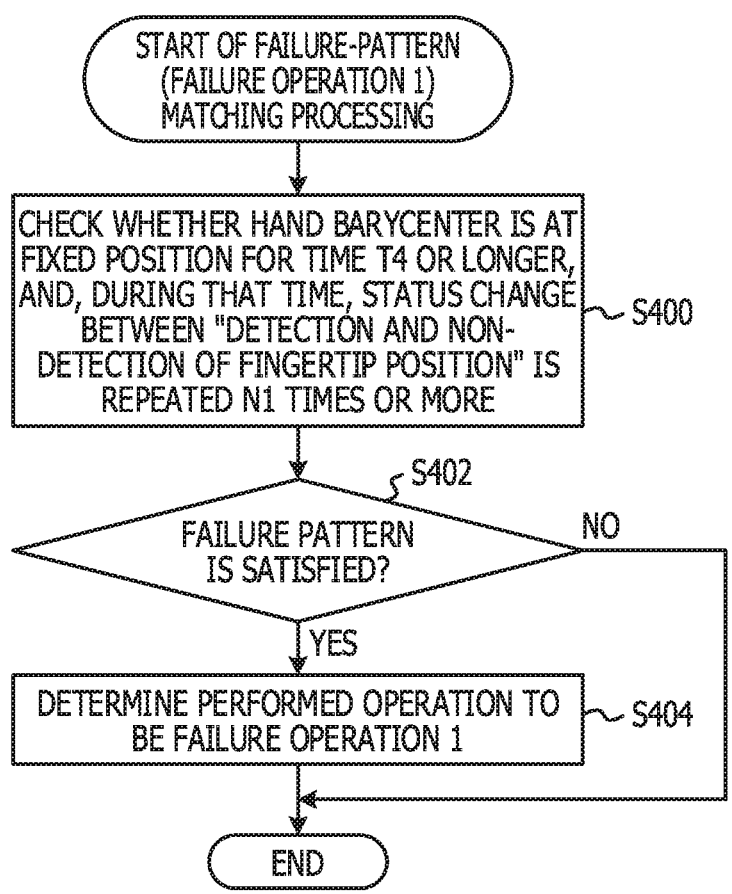
FIG. 15 is a flowchart of an example of failure-pattern matching processing of matching against a failure pattern corresponding to a failure operation 1.

Specific processing of the failure-pattern matching processing is described. FIG. 15 illustrates a flowchart of an example of failure-pattern matching processing to be performed for matching against the failure pattern corresponding to the failure operation 1.

In step S400, the failure-operation detection section 33 checks, for both hands, whether the barycenter of a hand region is at a fixed position for a time T4 or longer, and, during that time, a status change between detection and non-detection of a fingertip position in the hand region is repeated a predetermined number (N1) of times or more. Specifically, the failure-operation detection section 33 checks whether the status change is repeated N1 times or more, based on a detection result of the hand region detected by the hand-shape analysis section 22 in the captured image 70 having the predetermined number of consecutive frames. Here, values used for the time T4 and the predetermined number N1 of times are obtained by experiment beforehand based on results of operations performed by users.

Next, in step S402, the failure-operation detection section 33 determines whether the failure pattern is satisfied. When it is found that the status change is repeated N1 times or more in step S400 described above, the determination results in a positive, and the processing proceeds to step S404. In step S404, the failure-operation detection section 33 determines that the performed operation is the failure operation 1, and then ends the processing of matching against the failure pattern corresponding to the failure operation 1. On the other hand, when the determination results in a negative in step S402, the processing of matching against the failure pattern corresponding to the failure operation 1 ends.

Figure 16:
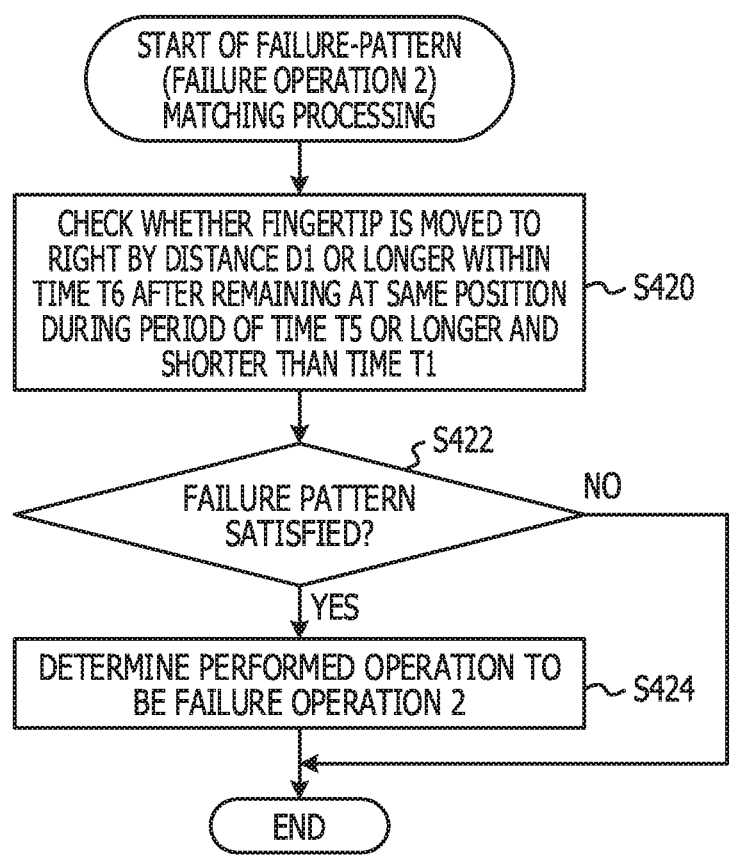
FIG. 16 is a flowchart of an example of failure-pattern matching processing of matching against a failure pattern corresponding to a failure operation 2.

As another specific processing of the failure-pattern matching processing, FIG. 16 illustrates a flowchart of an example of failure-pattern matching processing to be performed for matching against the failure pattern corresponding to the failure operation 2.

In step S420, the failure-operation detection section 33 checks whether, after the position of the fingertip of the right hand remains the same for a period of a time T5 or longer and shorter than the time T1, the position of the fingertip is moved to the right (in a predetermined direction) by a distance D1 or longer until a time T6 passes.

The time T1 is a time to be taken until a designated region desired to be enlarged and displayed is fixed in the mode 1 (fixing) of the image processing in the first embodiment. Values used for the time T5 and the distance D1 are obtained by experiment beforehand based on results of operations performed by users.

Next, in step S422, the failure-operation detection section 33 determines whether the failure pattern is satisfied. When it is found that the position of the fingertip of the right hand moves after remaining in the same position as described above in step S420, the determination results in a positive, and the processing proceeds to step S424. In step S424, the failure-operation detection section 33 determines that the performed operation is the failure operation 2, and then ends the processing of matching against the failure pattern corresponding to the failure operation 2. On the other hand, when the determination results in a negative in step S422, the processing of matching against the failure pattern corresponding to the failure operation 2 ends.

Figure 17:
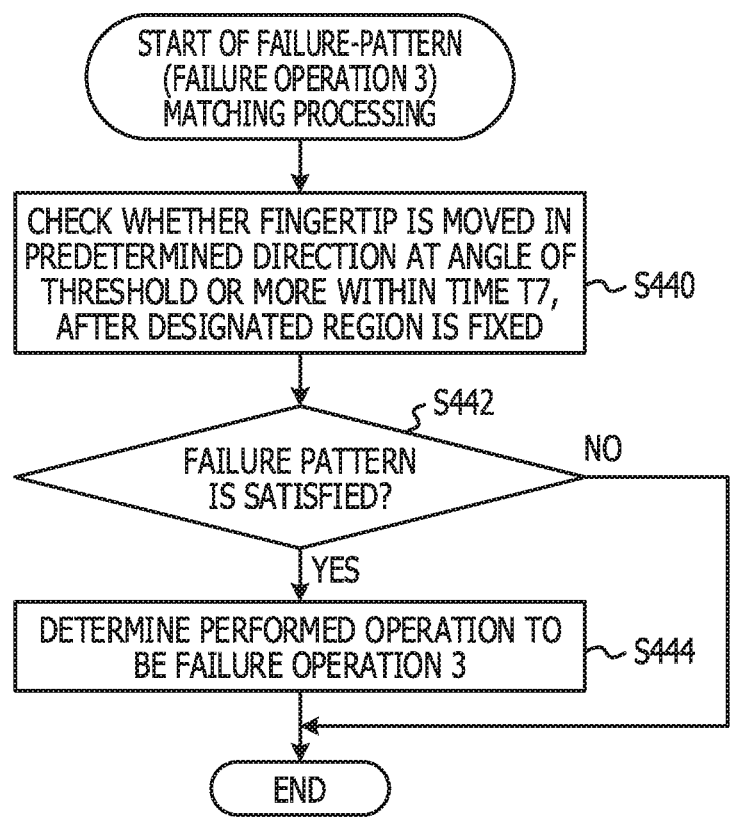
FIG. 17 is a flowchart of an example of failure-pattern matching processing of matching against a failure pattern corresponding to a failure operation 3.

As another specific processing of the failure-pattern matching processing, FIG. 17 illustrates a flowchart of an example of failure-pattern matching processing to be performed for matching against the failure pattern corresponding to the failure operation 3.

In step S440, the failure-operation detection section 33 checks whether the position of the fingertip of the right hand is moved in a predetermined direction (a lower rightward direction and an upper rightward direction) at an angle of a predetermined threshold or more, within a time T7, after a designated region is fixed.

Values used for the time T7 and the predetermined angle are obtained by experiment beforehand based on results of operations performed by users.

Next, in step S444, the failure-operation detection section 33 determines whether the failure pattern is satisfied. When it is found that the position of the fingertip of the right is moved as described above in step S440, the determination results in a positive, and the processing proceeds to step S444. In step S444, the failure-operation detection section 33 determines that the performed operation is the failure operation 3, and then ends the processing of matching against the failure pattern corresponding to the failure operation 3. On the other hand, when the determination results in a negative in step S442, the processing of matching against the failure pattern corresponding to the failure operation 3 ends.

When the failure-pattern matching processing is thus completed, the processing subsequently proceeds to step S352. In step S352, the failure-operation detection section 33 determines whether a result of the matching processing satisfies the failure pattern. When the determination results in a positive, the processing proceeds to step S354.

In step S354, the failure-operation detection section 33 determines that the performed operation is a failure operation, based on the result of the matching processing, and then ends the present failure-operation detection processing.

On the other hand, when the determination results in a negative in step S352, the processing proceeds to step S356. In step S356, the failure-operation detection section 33 determines whether matching against all the failure patterns stored in the failure pattern DB 34 is completed.

When the determination results in a negative, the processing returns to step S350, and repeats the failure-pattern matching processing. For example, after the matching processing (see FIG. 15) for the failure operation 1 is completed, the matching processing is performed for another failure pattern for which the matching processing is yet to be performed, such as the matching processing for the failure operation 2 (see FIG. 16).

On the other hand, when the determination results in a positive in step S356, the processing proceeds to step S358. In step S358, the failure-operation detection section 33 determines that the performed operation is not a failure operation, and ends the present processing. When the user 8 properly performs a designation operation or a specification operation, or when the user 8 makes some kind of movement other than operations, the performed operation or movement is determined not to be a failure operation.

When the failure-operation detection processing by the failure-operation detection section 33 is thus completed, the processing proceeds to step S304 in the image processing.

In step S304, the failure-operation detection section 33 determines whether a failure operation is detected in the failure-operation detection processing described above. When no failure operation is detected, the processing proceeds to step S306.

In step S306, normal operation processing is performed, and then, the processing proceeds to step S318. The normal operation processing in the present embodiment corresponds to the image processing except for step S140 and step S142 (see FIG. 7) described above in the first embodiment. Therefore, the normal operation processing is not described in detail.

On the other hand, when the determination results in a positive in step S304, the processing proceeds to step S308. In step S308, the failure-operation detection section 33 changes the set mode from the normal mode to the assistance mode, and then, the processing proceeds to step S318.

If the set mode is thus changed to the assistance mode, then in step S300 described above, the determination results in a negative, and the processing proceeds to step S310.

In step S310, the operation-intention determination section 35 determines an operation intended by the user 8. Specifically, the operation-intention determination section 35 performs operation-intention determination processing according to the detected failure operation.

Figure 18:
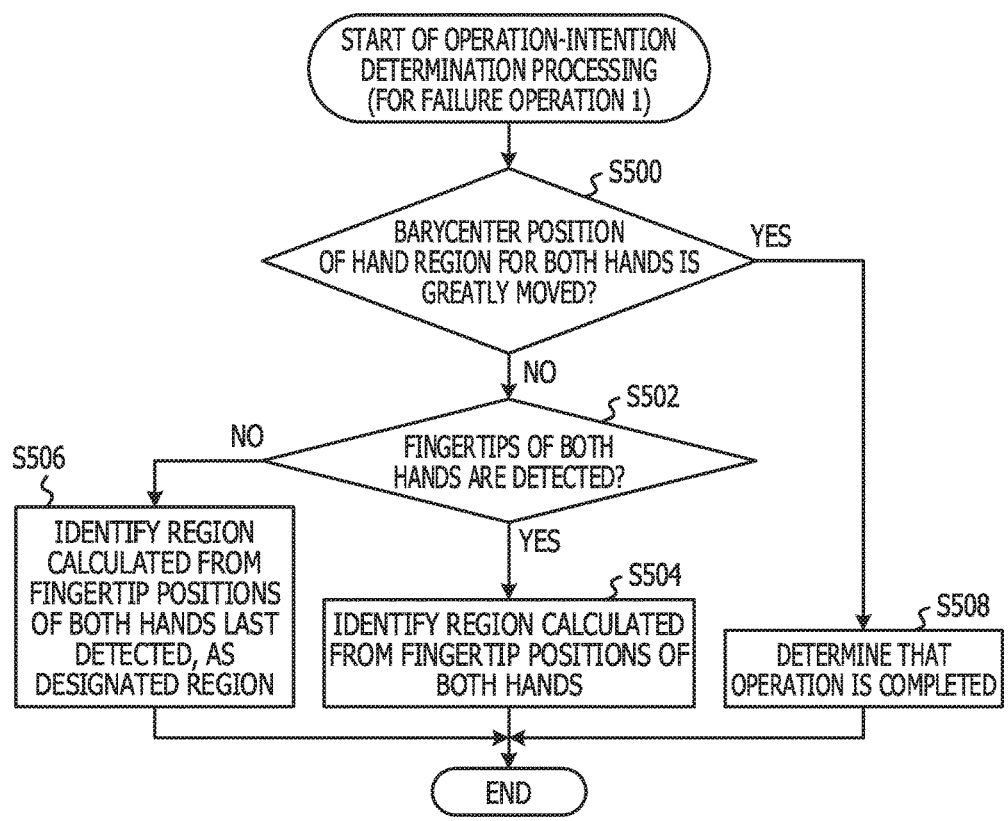
FIG. 18 is a flowchart of an example of operation-intention determination processing corresponding to the failure operation 1.

Specific processing of the operation-intention determination processing is described. FIG. 18 illustrates a flowchart of an example of operation-intention determination processing corresponding to the failure operation 1.

In step S500, the operation-intention determination section 35 determines whether a barycenter position of a hand region is greatly moved, for both hands. Based on a detection result of the hand region detected by the hand-shape analysis section 22, the operation-intention determination section 35 calculates a movement amount of the barycenter position, and performs the determination based on the calculated movement amount. The movement amount of the barycenter position may be a movement amount of a barycenter position of one of the right or left hand regions, which is selected beforehand, or may be a change in the distance between the right hand region and the left hand region.

When the determination results in a negative, the processing proceeds to step S502. In step S502, based on the detection result of the hand region detected by the hand-shape analysis section 22, the operation-intention determination section 35 determines whether the fingertips of both hands are detected. When the determination results in a positive, the processing proceeds to step S504.

In step S504, the operation-intention determination section 35 identifies a region calculated from the positions of the fingertips of both hands, as a designated region, and ends the present operation-intention determination processing. The method of identifying the designated region may be similar to the region identification processing (see FIG. 9) performed in the image processing apparatus 16 of the first embodiment.

On the other hand, when the determination results in a negative in step S502, the processing proceeds to step S506. In step S506, the operation-intention determination section 35 identifies a designated region by performing a calculation using the positions of the fingertips of both hands, based on the last (latest) detection result among detection results obtained by detection of the fingertips of both hands by the hand-shape analysis section 22. The operation-intention determination section 35 then ends the present operation-intention determination processing.

Further, when the determination results in a positive in step S500, the processing proceeds to step S508. In step S508, the operation-intention determination section 35 determines that the operation is completed, and then ends the present operation-intention determination processing.

When thus performing the operation-intention determination processing corresponding to the failure operation 1, the operation-intention determination section 35 determines that the operation intended by the user 8 is a designation operation of designating a region.

Figure 19:
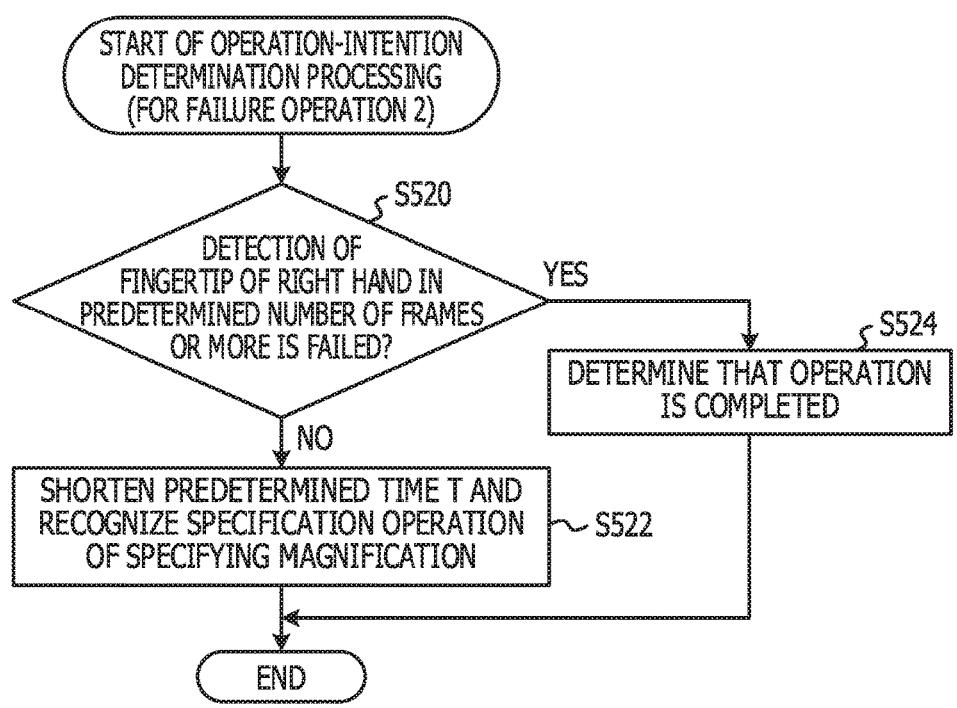
FIG. 19 is a flowchart of an example of operation-intention determination processing corresponding to the failure operation 2.

As another specific processing of the operation-intention determination processing, FIG. 19 illustrates a flowchart of an example of operation-intention determination processing corresponding to the failure operation 2.

In step S520, based on an analysis result obtained by the hand-shape analysis section 22, the operation-intention determination section 35 determines whether detection of the fingertip of the right hand in a predetermined number of frames or more is failed. When the fingertip of the right hand is detected in the predetermined number of frames or more, the determination results in a negative and the processing proceeds to step S522. In step S522, the operation-intention determination section 35 shortens the predetermined time T1, recognizes a specification operation of specifying a magnification, and then ends the present operation-intention determination processing. A value used for how much the predetermined time T1 is to be shortened may be obtained by experiment beforehand based on results of operations performed by users, but is preferably longer than a time corresponding to the predetermined number of frames.

On the other hand, when the determination results in a positive in step S520, the processing proceeds to step S524. In step S524, the operation-intention determination section 35 determines that the operation is completed, and then ends the present operation-intention determination processing.

When thus performing the operation-intention determination processing corresponding to the failure operation 2, the operation-intention determination section 35 determines that the operation intended by the user 8 is a designation operation of fixing a designated region desired to be enlarged.

Figure 20:
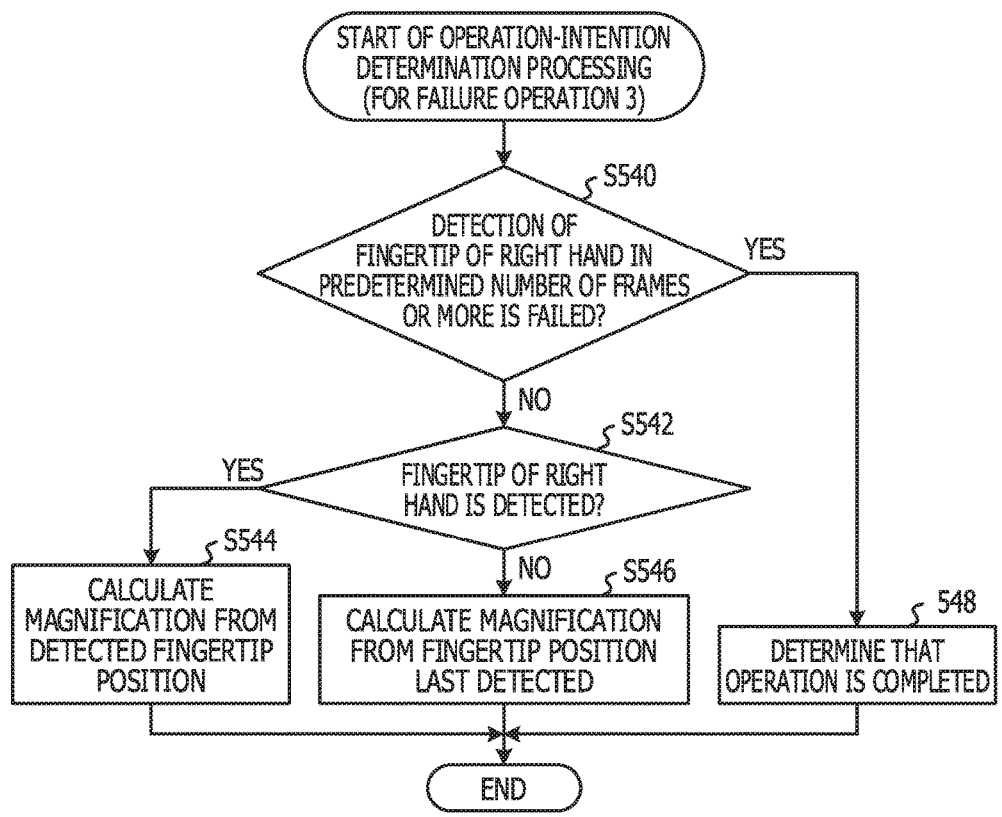
FIG. 20 is a flowchart of an example of operation-intention determination processing corresponding to the failure operation 3.

Furthermore, as another specific processing of the operation-intention determination processing, FIG. 20 illustrates a flowchart of an example of operation-intention determination processing corresponding to the failure operation 3.

In step S540, based on an analysis result obtained by the hand-shape analysis section 22, the operation-intention determination section 35 determines whether detection of the fingertip of the right hand in a predetermined number of frames or more is failed. When the fingertip of the right hand is detected in the predetermined number of frames or more, the determination results in a negative and the processing proceeds to step S542.

In step S542, based on the analysis result obtained by the hand-shape analysis section 22, the operation-intention determination section 35 determines whether the fingertip of the right hand is detected. When this determination results in a positive, the processing proceeds to step S544. In step S544, the operation-intention determination section 35 calculates a magnification from the position of the detected fingertip, and then ends the present operation-intention determination processing. The method of calculating the magnification may be similar to the magnification identification processing (see FIG. 10) performed in the image processing apparatus 16 of the first embodiment.

On the other hand, when the determination results in a negative in step S542, the processing proceeds to step S546. In step S546, the operation-intention determination section 35 calculates a magnification based on the last (latest) detection result among detection results of detecting the fingertip of the right hand obtained by the hand-shape analysis section 22, and then ends the present operation-intention determination processing.

When the determination results in a positive in step S540, the processing proceeds to step S548. In step S548, the operation-intention determination section 35 determines that the operation is completed, and ends the present operation-intention determination processing.

When thus performing the operation-intention determination processing corresponding to the failure operation 3, the operation-intention determination section 35 determines that the operation intended by the user 8 is a specification operation of magnifying a designated region.

In the image processing of the present embodiment, when the operation-intention determination processing according to the failure operation is thus completed, the processing proceeds to step S312.

In step S312, the operation-intention determination section 35 generates contents corresponding to the determination result of the operation-intention determination processing, and superimposes the contents on the captured image 70. In addition, information of assisting in an appropriate operation procedure is displayed on the captured image 70.

For the method of generating the contents according to the determination result, a method similar to the image processing (see FIG. 7) of the first embodiment (for example, the method described above in step S114, step S122, or the like) may be used.

The information of assisting in the appropriate operation procedure in the image processing apparatus 16A of the present embodiment is presented by displaying an image and a message for an appropriate operation procedure (a gesture) corresponding to the operation intended by the user 8 determined in step S310, on the captured image 70. It goes without saying that the presentation of the information of assisting in the appropriate operation procedure is not limited to these examples.

Figure 21:
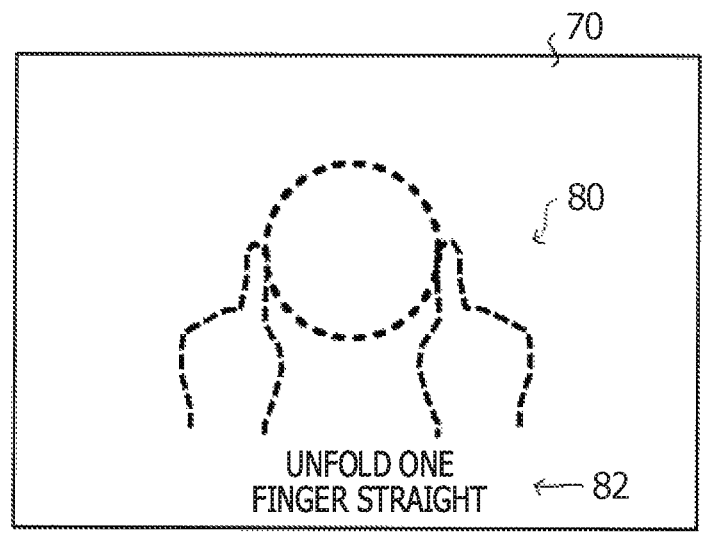
FIG. 21 is a diagram illustrating a specific example of an operation procedure presented when an operation intended by the user is determined to be a designation operation of designating a region.

A specific example of the presentation of the operation procedure is described. FIG. 21 illustrates a specific example of an operation procedure to be presented when an operation intended by the user 8 is determined to be a designation operation of designating a region (when the operation-intention determination processing corresponding to the failure operation 1 is performed). As illustrated in FIG. 21, an image 80 and a message 82 for an appropriate operation procedure are displayed in the captured image 70.

Figure 22:
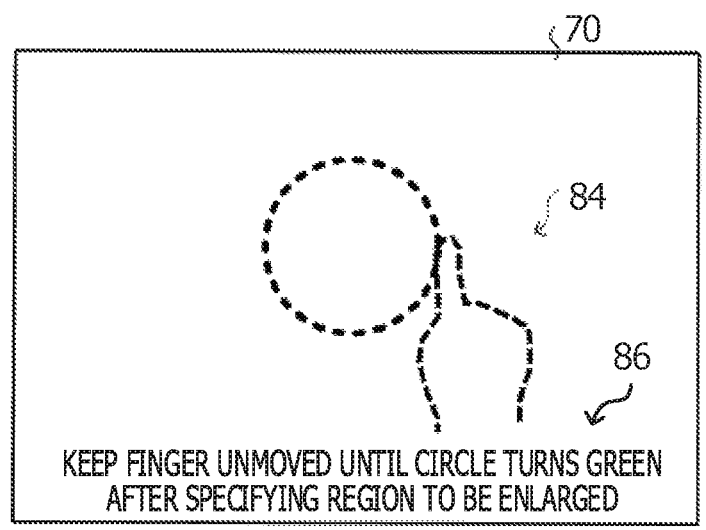
FIG. 22 is a diagram illustrating a specific example of an operation procedure presented when an operation intended by the user is determined to be a designation operation of fixing a designated region desired to be enlarged.

FIG. 22 illustrates a specific example of an operation procedure to be presented when an operation intended by the user 8 is determined to be a designation operation of fixing a designated region desired to be enlarged (when the operation-intention determination processing corresponding to the failure operation 2 is performed). As illustrated in FIG. 22, an image 84 and a message 86 for an appropriate operation procedure are displayed in the captured image 70.

Figure 23:
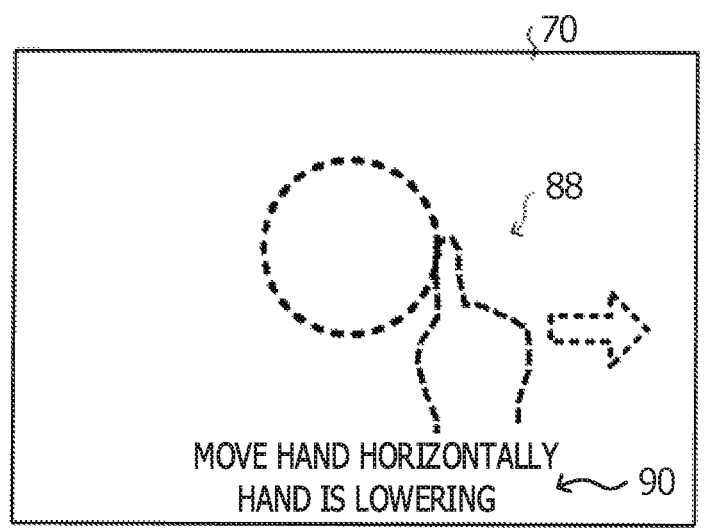
FIG. 23 is a diagram illustrating a specific example of an operation procedure presented when an operation intended by the user is determined to be a specification operation of specifying a magnification of a designated region.

FIG. 23 illustrates a specific example of an operation procedure to be presented when an operation intended by the user 8 is determined to be a specification operation of specifying a magnification (when the operation-intention determination processing corresponding to the failure operation 3 is performed). As illustrated in FIG. 23, an image 88 and a message 90 for an appropriate operation procedure are displayed in the captured image 70.

In FIGS. 21 to 23, display of contents generated by the operation-intention determination section 35 is omitted.

As illustrated in FIGS. 21 to 23, according to the image processing apparatus 16A, the HMD 12 displays an appropriate operation procedure and a message suggesting the appropriate operation procedure, so that the user 8 readily recognizes the appropriate operation procedure. This makes it easy for the user 8 to perform an appropriate operation, in particular, an appropriate operation in and after the next attempt.

Next, in step S314, the operation-intention determination section 35 determines whether the operation is completed. The determination results in a negative, until the operation-intention determination processing in step S310 described above is determined to be completed, and the processing proceeds to step S318. In other words, the assistance mode is repeated until the operation is determined to be completed.

On the other hand, when the operation is determined to be completed, the determination results in a positive in step S314, and the processing proceeds to step S316. In step S316, the operation-intention determination section 35 changes the mode to the normal mode, and then the processing proceeds to step S318.

Step S318 and step S320 are similar to step S140 and step S142 of the image processing (see FIG. 7) of the first embodiment, respectively, and therefore are not described.

In this way, in the image processing apparatus 16A of the present embodiment, even if the user 8 fails to perform an intended operation, a failure operation may be detected by the failure-operation detection section 33. In addition, when the user 8 fails to perform an intended operation, the image processing apparatus 16A shifts to the assistance mode. By the shift to the assistance mode, the operation-intention determination section 35 determines an operation intended by the user 8, based on the detected failure operation, and the HMD 12 displays contents corresponding to the determined operation and information of assisting in an appropriate operation.

Therefore, according to the image processing apparatus 16A, the user 8 is allowed to continue an operation, even if the user 8 fails to perform an intended operation.

[Third Embodiment]

In the above-described embodiments, the case where the image processing system 10 and 10A each perform fixed display or enlarged display of a designated region in the captured image 70 is described as a specific example. Another specific example is described in a third embodiment.

Figure 24:
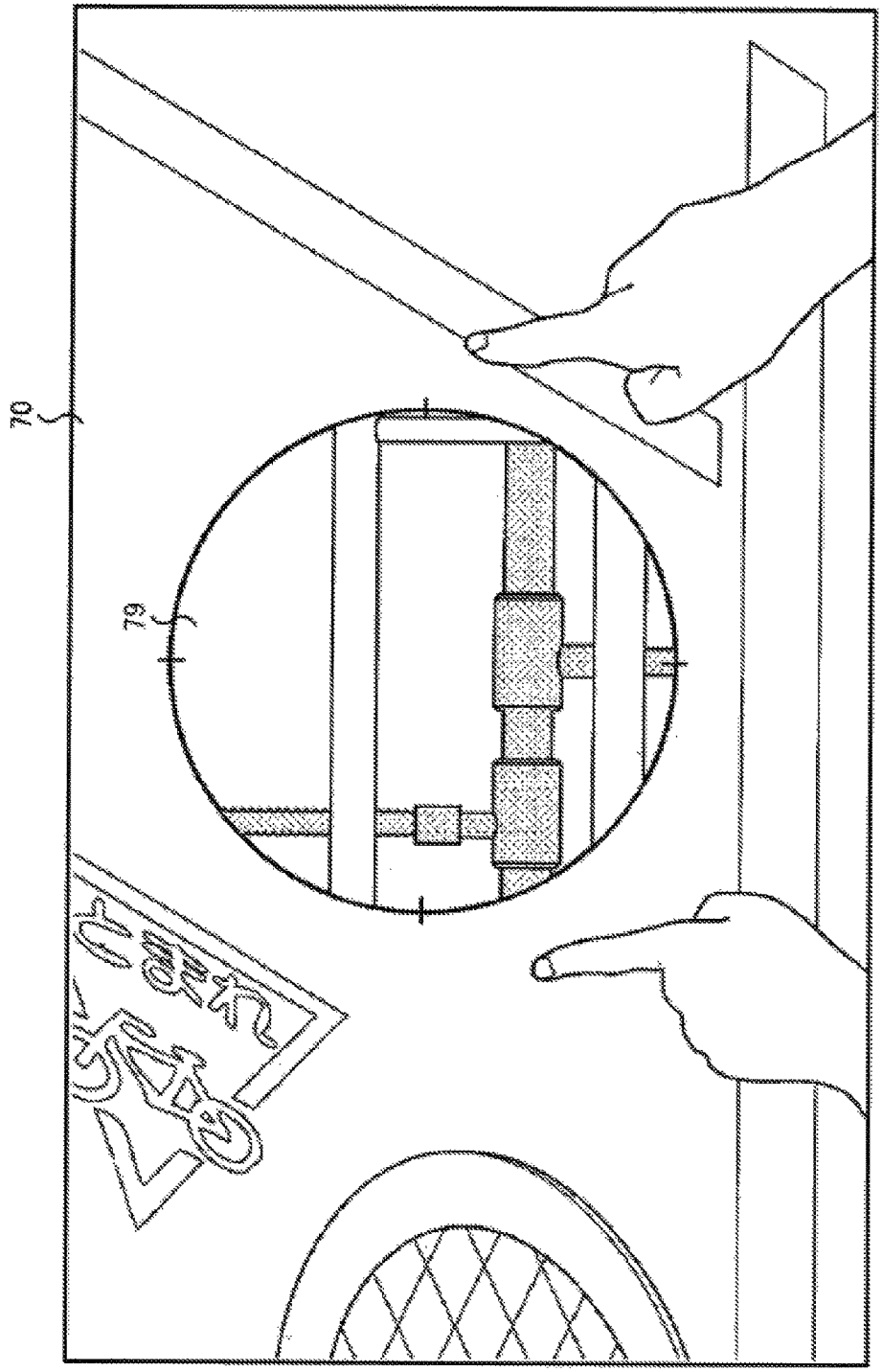
FIG. 24 is a diagram illustrating a case where the user confirms a position of piping embedded under a road in field work, as a specific example of a third embodiment.

In the present embodiment, as illustrated in FIG. 24, a case where the user 8 checks a position of piping embedded under a road in field work is described as a specific example. FIG. 24 illustrates a specific example of display of the HMD 12 in a state of displaying an image 79 of piping embedded under a road, within a designated region on the road.

Figure 25:
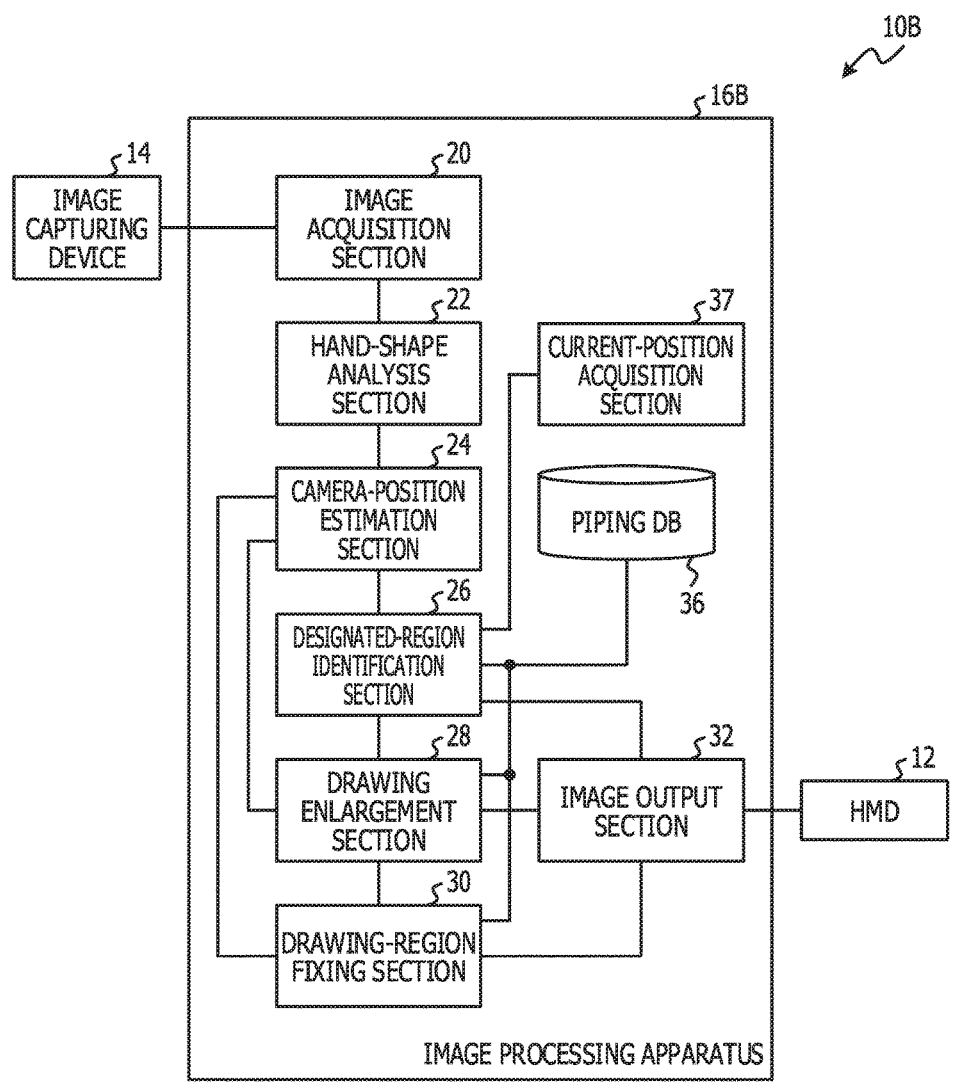
FIG. 25 is a functional block diagram illustrating a schematic configuration of an example of an image processing apparatus according to the third embodiment.

FIG. 25 is a functional block diagram illustrating a schematic configuration of an example of an image processing apparatus according to the present embodiment.

As illustrated in FIG. 25, an image processing apparatus 16B of an image processing system 10B in the present embodiment is different from the image processing apparatus 16 in the first embodiment in that a piping DB 36 and a current-position acquisition section 37 are further provided.

The piping DB 36 stores information to generate the image 79 of the piping. Specific examples of the information include image data such as a gas piping diagram and a water piping diagram. The piping DB 36 is not limited to a database included in the image processing apparatus 16B, and another database provided in a device outside the image processing apparatus 16B may be used.

The current-position acquisition section 37 has a function of acquiring the current position of the image processing apparatus 16B. The current-position acquisition section 37 acquires the current position of the HMD 12. The image processing apparatus 16B of the present embodiment is assumed to be used by the user 8, in such a state that the image processing apparatus 16B is disposed near the HMD 12. Therefore, the position of the image processing apparatus 16B itself is assumed to be the position of the HMD 12. Specific examples of the current-position acquisition section 37 include a device that acquires the current position by using the Global Positioning System (GPS), or by reading an AR marker.

Figure 26:
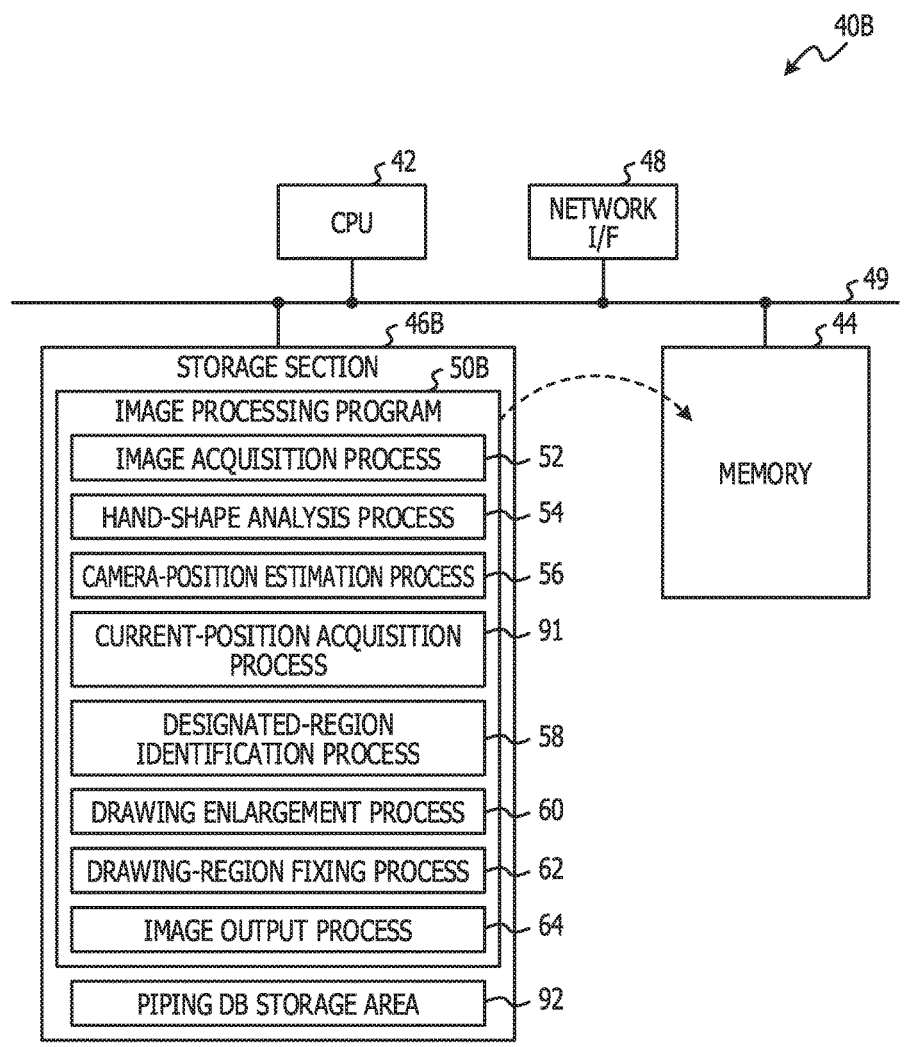
FIG. 26 is a block diagram illustrating a schematic configuration of a computer that serves as the image processing apparatus according to the third embodiment.

In addition, the image processing apparatus 16B may be implemented by, for example, a computer 40B illustrated FIG. 26. To be more specific, the image processing apparatus 16B may be implemented by the computer 40B serving as a server. The computer 40B includes a storage section 46B in place of the storage section 46 of the computer 40 of the first embodiment.

The storage section 46B stores an image processing program 50B that causes the computer 40B to serve as the image processing apparatus 16B. The image processing program 50B includes a current-position acquisition process 91, in addition to each process of the image processing program 50 in the first embodiment.

The CPU 42 operates as the current-position acquisition section 37 by executing the current-position acquisition process 91.

Further, a piping DB storage area 92 of the storage section 46B serves as a storage area where the piping DB 36 is stored.

The computer 40B executing the image processing program 50B thereby serves as the image processing apparatus 16B.

Figure 27:
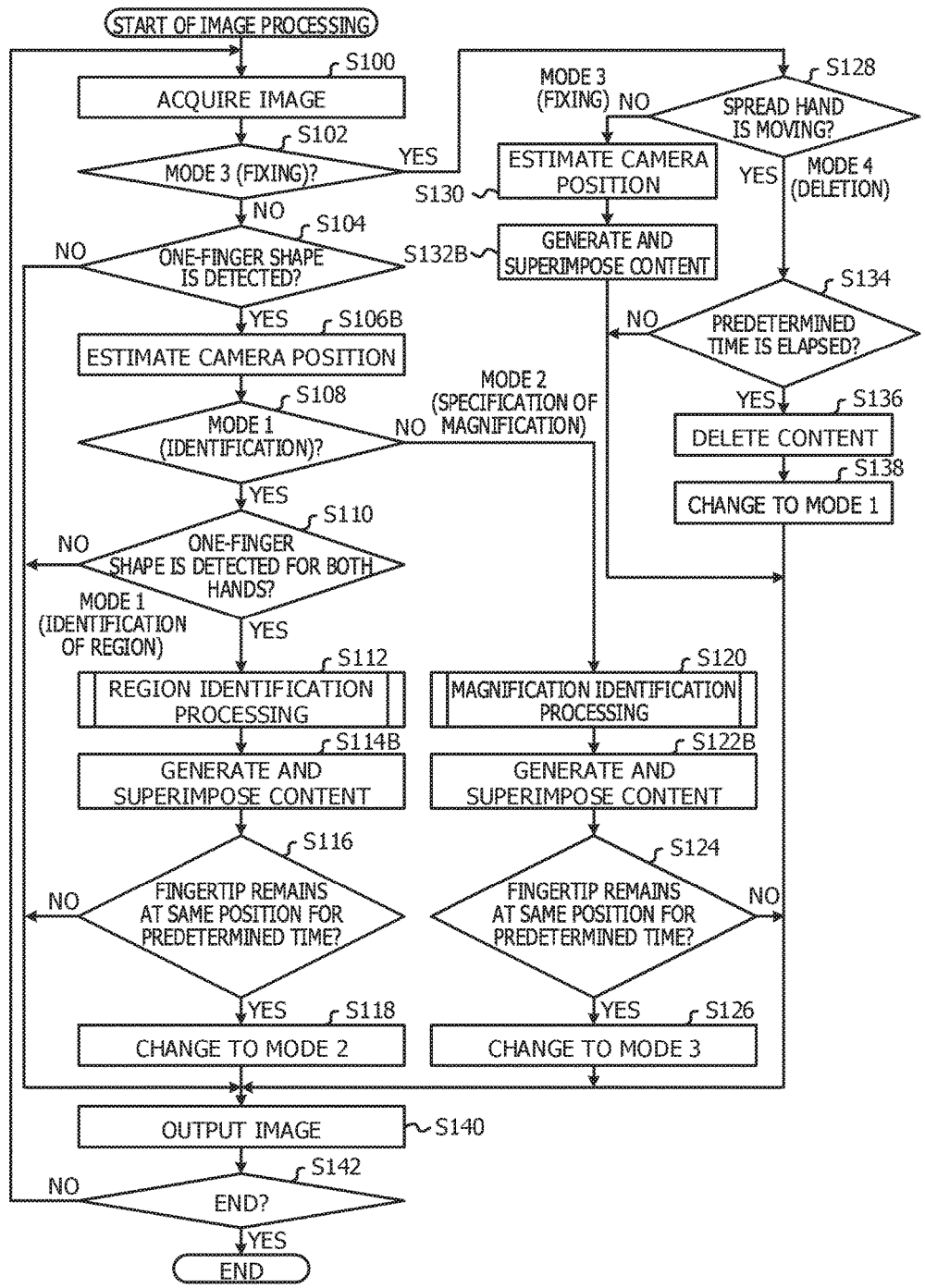
FIG. 27 is a flowchart of an example of image processing to be performed in the image processing apparatus according to the third embodiment.

Next, operation of the image processing system 10B according to the present embodiment is described. FIG. 27 illustrates a flowchart of an example of image processing to be performed in the image processing apparatus 16B. The image processing to be performed in the image processing apparatus 16B of the present embodiment includes processing similar to the image processing (see FIG. 7) performed in the image processing apparatus 16 of the first embodiment. Therefore, any processing mentioned below as such similar processing is not described in detail.

As illustrated in FIG. 27, the image processing to be performed in the image processing apparatus 16B of the present embodiment includes step S106B, in place of step S106 of the image processing apparatus 16 (see FIG. 7) in the first embodiment. In addition, steps S114B, S122B, and S132B are included in place of steps S114, S122, and S132, respectively.

In step S106B of the image processing of the present embodiment, the position of the image capturing device 14 is estimated by the camera-position estimation section 24 in a manner similar to step S106 of the image processing of the first embodiment. In addition, in step S106B, the current-position acquisition section 37 acquires the current position in the real world.

Further, in step S114B of the image processing of the present embodiment, the designated-region identification section 26 generates the image 79 of the piping corresponding to the current position acquired by the current-position acquisition section 37, as contents, based on the information stored in the piping DB 36. The designated-region identification section 26 then superimposes the generated image 79 of the piping on the captured image 70. Furthermore, in each of step S122B and step S132B, contents are generated and then superimposed on the captured image 70 in a manner similar to step S114B.

As described above, the image processing apparatus 16B of the present embodiment may also assists the user 8 in the field work by displaying the image 79 of the piping on the HMD 12.

[Fourth Embodiment]
Following the third embodiment, another specific example is described in a fourth embodiment.

Figure 28:
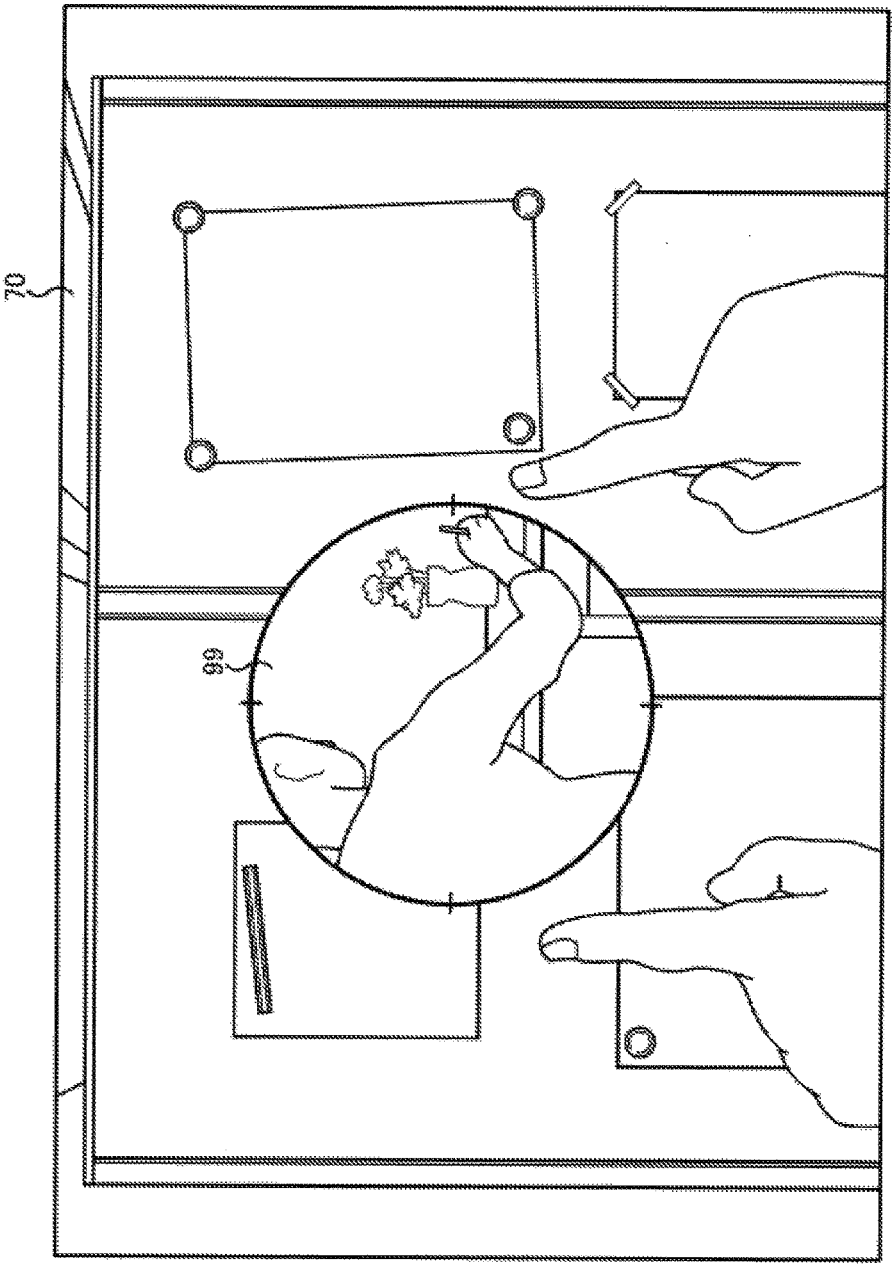
FIG. 28 is a diagram illustrating a case where the user confirms a position of piping embedded under a road in field work, as a specific example of a fourth embodiment.

In the present embodiment, a case, in which the user 8 checks a situation in a next room in field work by viewing an image taken by a camera installed in the next room, is described as a specific example, as illustrated in FIG. 28. FIG. 28 illustrates a specific example of display of the HMD 12 in a state of displaying a captured image 99 captured by an image capturing device 15 installed on the other side of a wall (in the next room), within a region designated by the user 8.

Figure 29:
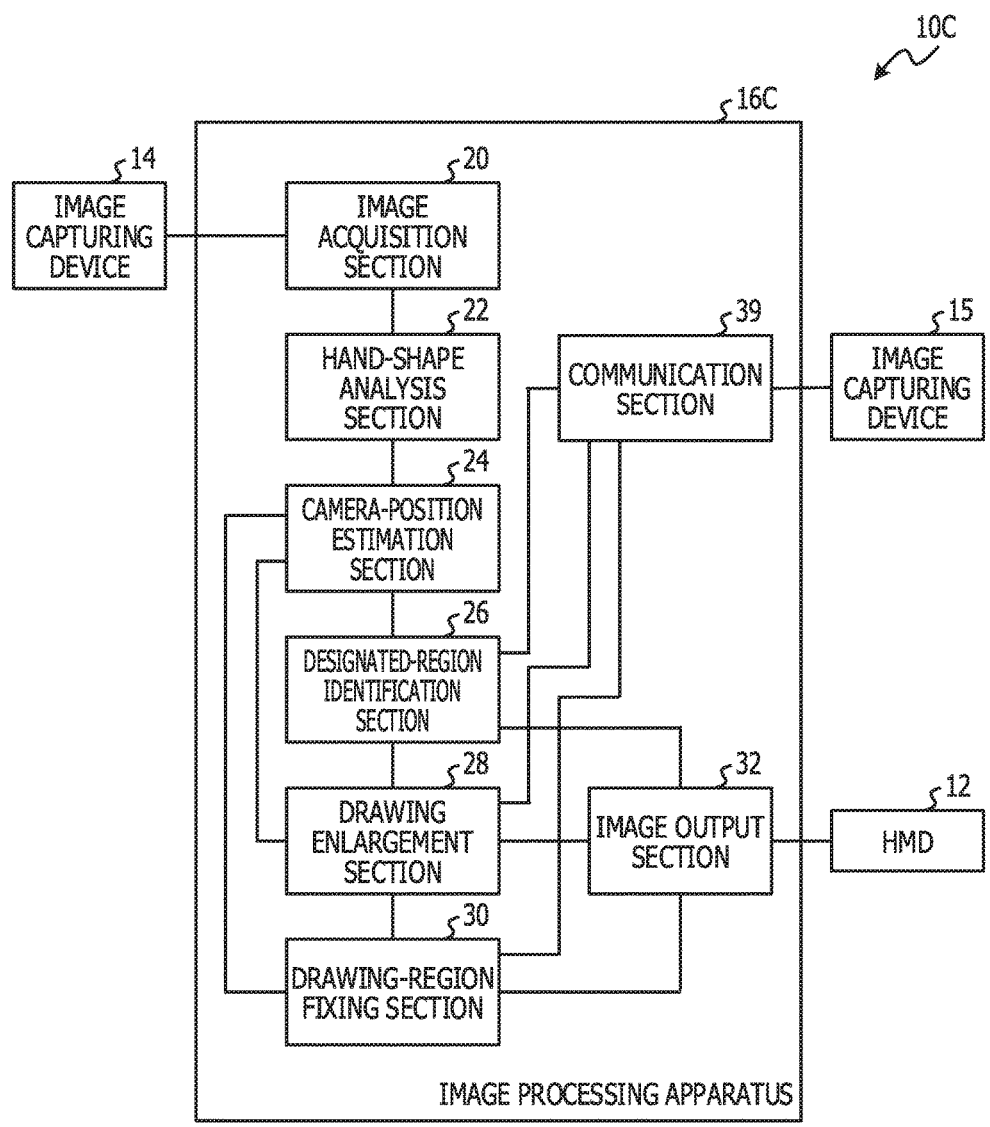
FIG. 29 is a functional block diagram illustrating a schematic configuration of an example of an image processing apparatus according to the fourth embodiment.

FIG. 29 is a functional block diagram illustrating a schematic configuration of an example of an image processing apparatus according to the present embodiment.

As illustrated in FIG. 29, an image processing apparatus 16C of an image processing system 10C of the present embodiment is different from the image processing apparatus 16 of the first embodiment in that a communication section 39 is further provided.

The communication section 39 receives the captured image 99 captured by the image capturing device 15 installed in the next room. The image processing apparatus 16C calibrates a positional relation between the image capturing device 15 and the real world beforehand. The communication section 39 and the image capturing device 15 may be connected to each other via the network 18 (see FIG. 1), or may be connected via another line or the like. Further, the connection between the communication section 39 and the image capturing device 15 may be either wire connection or wireless connection.

Figure 30:
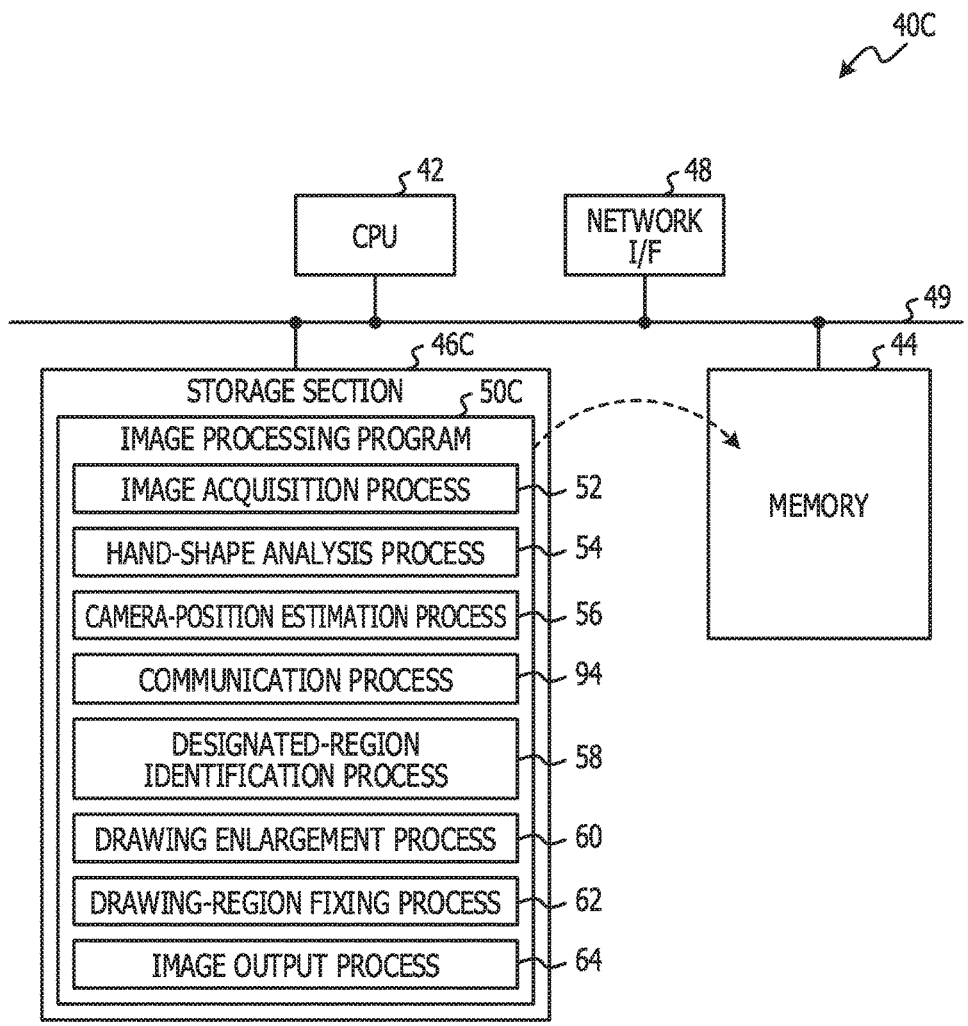
FIG. 30 is a block diagram illustrating a schematic configuration of a computer that serves as the image processing apparatus according to the fourth embodiment.

Moreover, the image processing apparatus 16C may be implemented by, for example, a computer 40C illustrated in FIG. 30. To be more specific, the image processing apparatus 16C may be implemented by the computer 40C serving as a server. The computer 40C includes a storage section 46C in place of the storage section 46 of the computer 40 in the first embodiment.

The storage section 46C stores an image processing program 50C that causes the computer 40C to serve as the image processing apparatus 16C. The image processing program 50C includes a communication process 94 in addition to each process of the image processing program 50 in the first embodiment.

The CPU 42 operates as the communication section 39, by executing the communication process 94.

The computer 40C executing the image processing program 50C thereby serves as the image processing apparatus 16C.

Figure 31:
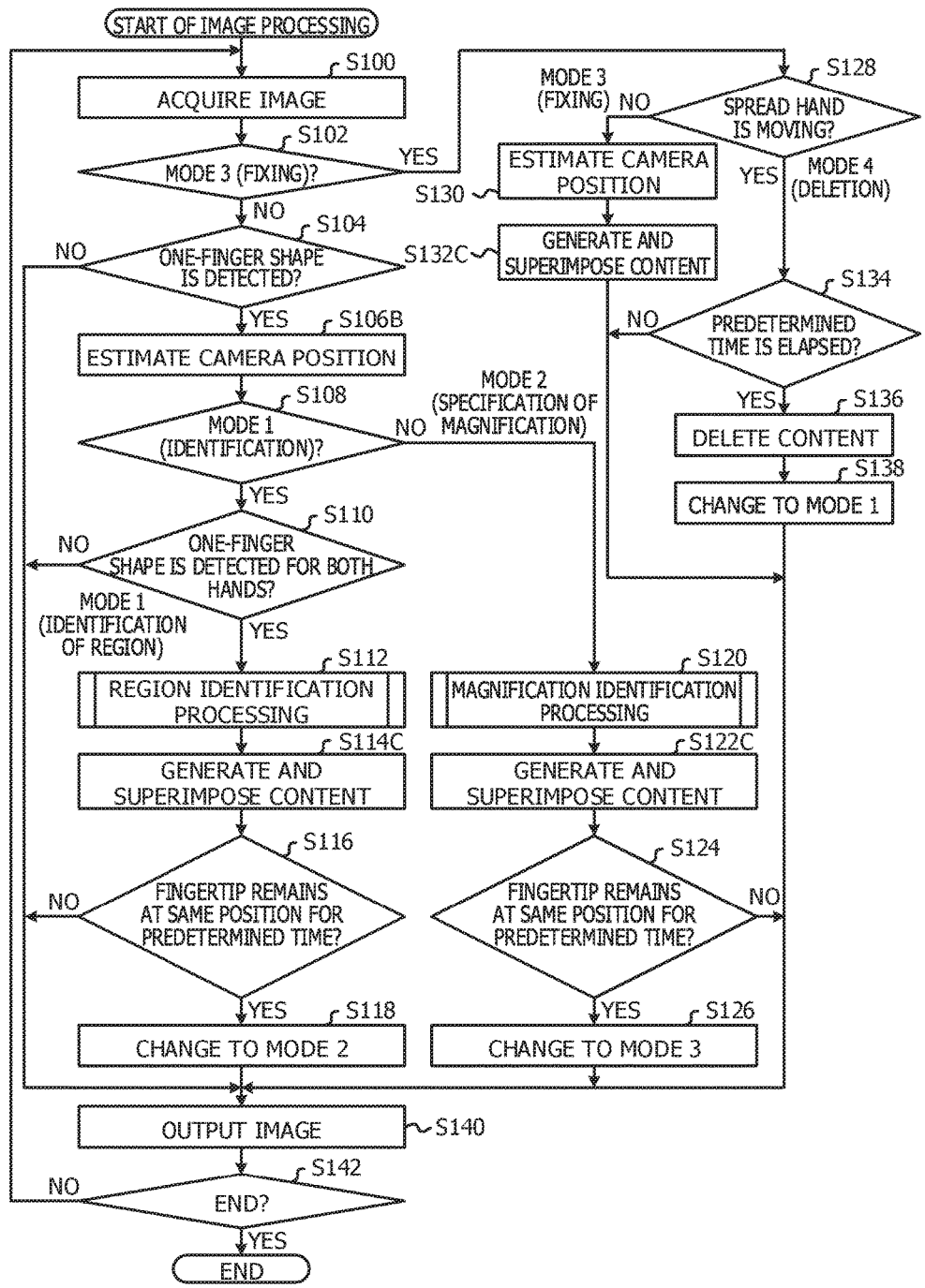
FIG. 31 is a flowchart of an example of image processing to be performed in the image processing apparatus according to the fourth embodiment.

Next, operation of the image processing system 10C according to the present embodiment is described. FIG. 31 illustrates a flowchart of an example of image processing to be performed in the image processing apparatus 16C. The image processing to be performed in the image processing apparatus 16C of the present embodiment includes processing similar to the image processing (see FIG. 7) performed in the image processing apparatus 16 of the first embodiment. Therefore, any processing mentioned below as such similar processing is not described in detail.

As illustrated in FIG. 31, the image processing to be performed in the image processing apparatus 16C of the present embodiment includes steps S114C, S122C, and S132C, in place of steps S114, S122, and S132 (see FIG. 7) of the image processing apparatus 16 in the first embodiment, respectively.

In step S114C of the image processing of the present embodiment, the designated-region identification section 26 generates contents by acquiring the captured image 99 captured by the image capturing device 15 via the communication section 39. The designated-region identification section 26 then superimposes the generated contents including the captured image 99 on the captured image 70 captured by the image capturing device 14. Further, in each of step S122C and step S132C, contents are generated and then superimposed on the captured image 70 in a manner similar to step S114C.

As described above, the image processing apparatus 16C of the present embodiment may also assist the user 8 in the field work by displaying the captured image 99 captured by the image capturing device 15 on the HMD 12.

In the present embodiment, the case where the number of the image capturing devices 15 is one is described, but the number of the image capturing devices 15 connected to the communication section 39 is not limited to one. For example, when the HMD 12 is caused to display the image of the piping as described in the third embodiment, the captured image 99 of the piping captured by multiple image capturing devices 15 may be displayed. In this case, the image capturing devices 15 may be disposed under the road, and the image processing apparatus 16C may acquire the captured image 99 captured by the image capturing device 15 provided to capture an image of the piping corresponding to an actual position according to the designated region of the user 8, via the communication section 39. Then, the image processing apparatus 16C may make the HMD 12 display the captured image 99 thus acquired.

[Fifth Embodiment]

In the embodiments described above, the gesture using both hands is used as the designation operation of designating a region is described as a specific example. In a fifth embodiment, a case where a designation operation is performed with a gesture using one hand is described.

In an image processing system 10D (see FIG. 32) of the present embodiment, first, the user 8 performs an operation (a gesture) using the one finger of one hand as a designation operation of designating a central position of a designated region, and subsequently performs a designation operation of designating a size of the designated region. Therefore, the image processing system 10D of the present embodiment has a mode 0 for designating a central position in addition to the modes 1 to 4 described in the first embodiment. At the initial state of an image processing apparatus 16D, the mode 0 is set.

Figure 32:
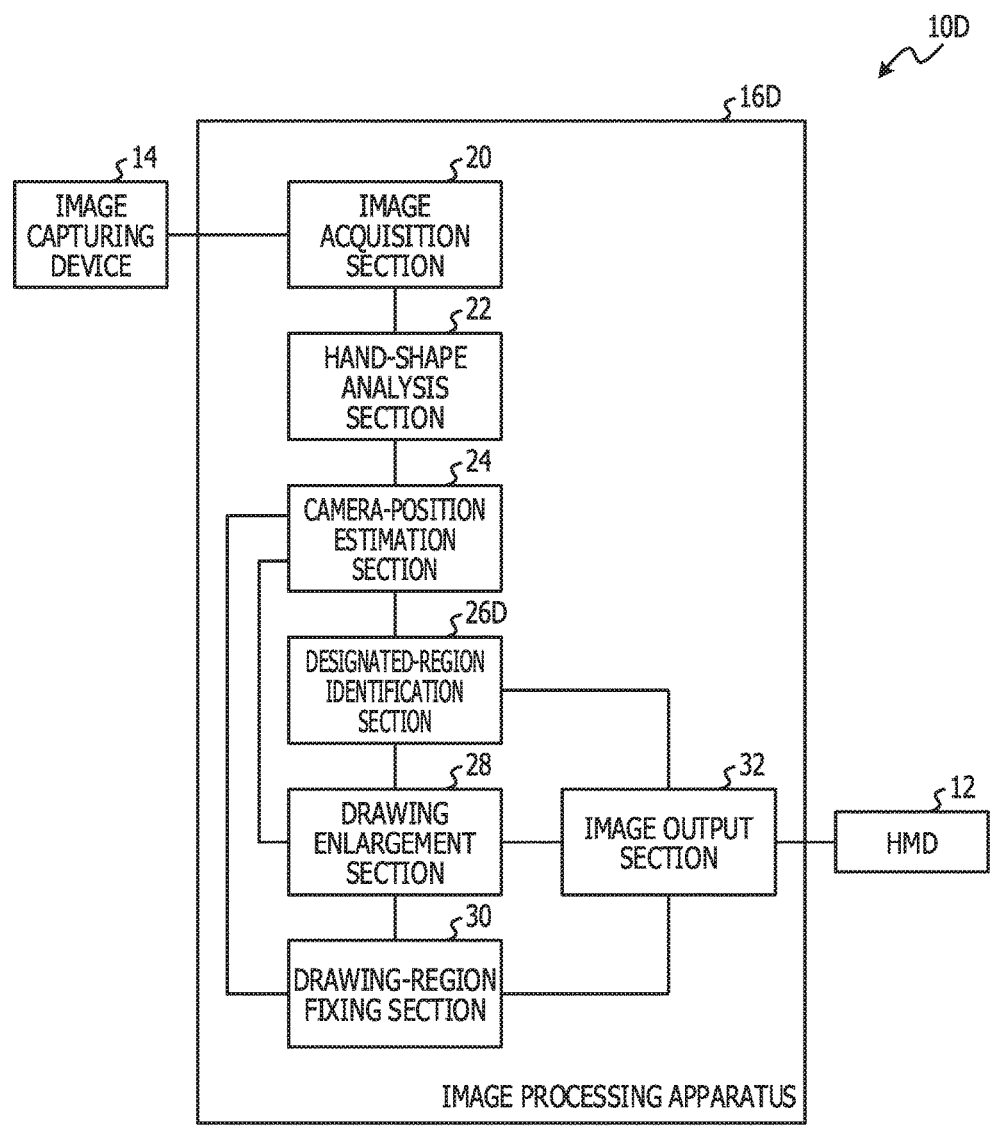
FIG. 32 is a functional block diagram illustrating a schematic configuration of an example of an image processing apparatus according to a fifth embodiment.

FIG. 32 is a functional block diagram illustrating a schematic configuration of an example of an image processing apparatus according to the present embodiment.

As illustrated in FIG. 32, the image processing apparatus 16D of the image processing system 10D in the present embodiment includes a designated-region identification section 26D in place of the designated-region identification section 26 provided in the image processing apparatus 16 of the first embodiment, which is a different point from the first embodiment.

Based on an analysis result obtained by the hand-shape analysis section 22, the designated-region identification section 26D first identifies the central position of a designated region, and then identifies the size of the designated region.

Figure 33:
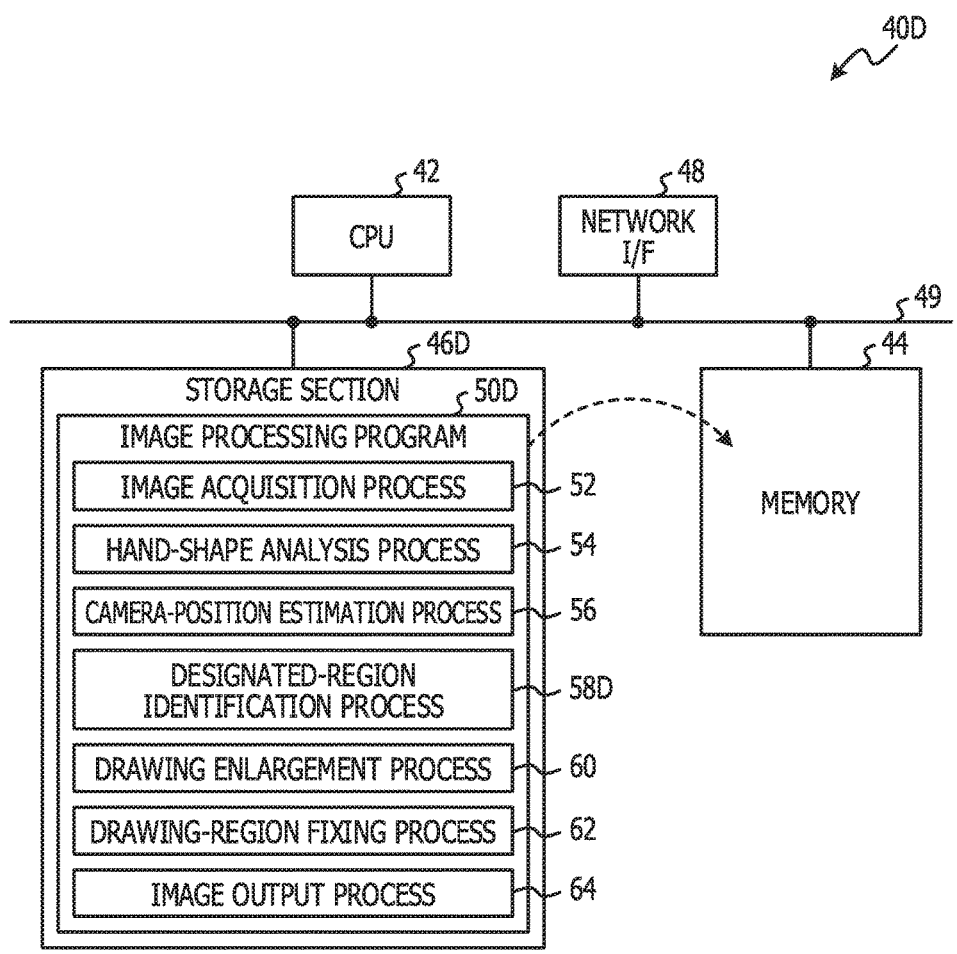
FIG. 33 is a block diagram illustrating a schematic configuration of a computer that serves as the image processing apparatus according to the fifth embodiment.

The image processing apparatus 16D may be implemented by, for example, a computer 40D illustrated in FIG. 33. To be more specific, the image processing apparatus 16D may be implemented by the computer 40D serving as a server. The computer 40D includes a storage section 46D, in place of the storage section 46 of the computer 40 in the first embodiment.

The storage section 46D stores am image processing program 50D that causes the computer 40D to serve as the image processing apparatus 16D. The image processing program 50D includes a designated-region identification process 58D in place of the designated-region identification process 58 of the image processing program 50 in the first embodiment.

The CPU 42 operates as the designated-region identification section 26D, by executing the designated-region identification process 58D.

The computer 40D executing the image processing program 50D thereby serves as the image processing apparatus 16D.

Figure 34A:
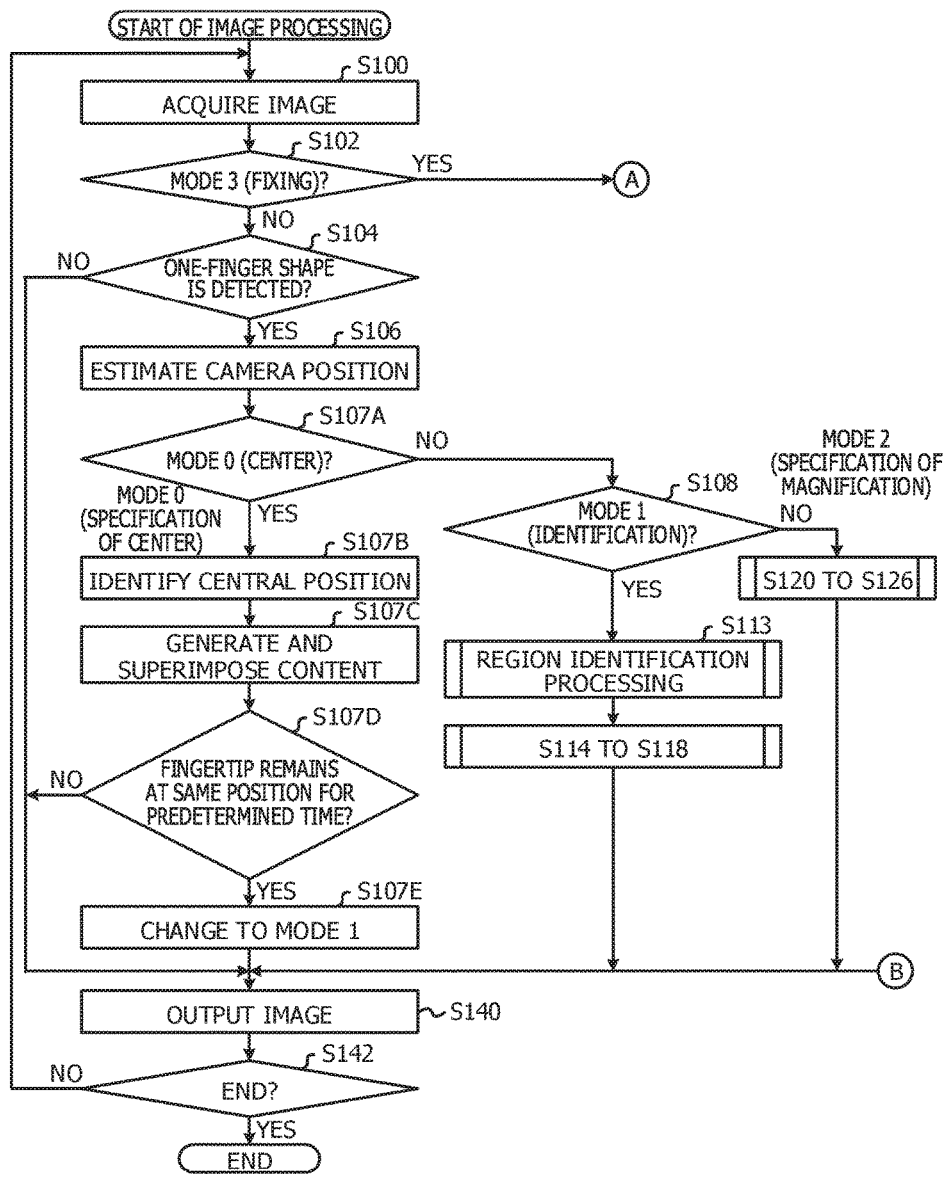
FIG. 34A and FIG. 34B are flowcharts of an example of image processing to be performed in the image processing apparatus according to the fifth embodiment.
Figure 34B:
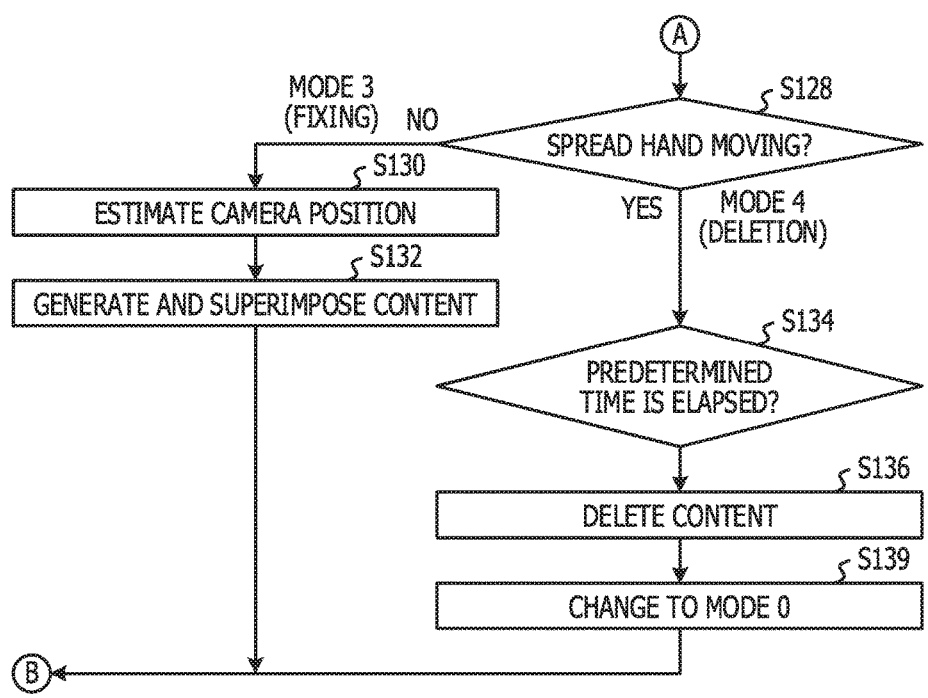

Next, operation of the image processing system 10D according to the present embodiment is described. FIG. 34 illustrates a flowchart of an example of image processing to be performed in the image processing apparatus 16D. The image processing to be performed in the image processing apparatus 16D of the present embodiment includes processing similar to the image processing (see FIG. 7) performed in the image processing apparatus 16 of the first embodiment. Therefore, any processing mentioned below as such similar processing is not described in detail.

As illustrated in FIG. 34, the image processing to be performed in the image processing apparatus 16D of the present embodiment includes steps S107A to 107E after step S106 of the image processing apparatus 16 (see FIG. 7) of the first embodiment. In addition, step S113 is provided in place of step S112, and step S139 is provided in place of step S138.

In the image processing of the present embodiment, the processing proceeds to step S107A after step S106.

In step S107A, the camera-position estimation section 24 determines whether the current mode is the mode 0. When the determination results in a positive, the processing proceeds to step S107B.

In step S107B, the designated-region identification section 26D identifies a central position. Specifically, based on an analysis result obtained by the hand-shape analysis section 22, the designated-region identification section 26D identifies a position (x0, y0) of the fingertip included in the one-finger shape of the right hand in the hand region (see the hand region 76R in Part (1) of FIG. 35), as the central position.

Next, in step S107C, the designated-region identification section 26D generates contents corresponding to the designated central position, and superimposes the contents on the captured image 70. A specific example in Part (1) of FIG. 35 illustrates a state where a center image 100 representing the center of the designated region is generated as the contents, and then superimposed on the captured image 70.

Next, in step S107D, the designated-region identification section 26D determines whether the position of the fingertip included in the one-finger shape of the right hand remains the same for a predetermined time T0. Specifically, the designated-region identification section 26D measures a time for which the coordinates of the position of the fingertip remains the same. The method for this measurement is not limited in particular, and may be performed in a manner similar to the measurement of the time in the image processing of the first embodiment. When the mode 0 is set, it is preferable to provide a function comparable to the indicator image 73 by varying a color of the center image 100 according to the measured time.

When the fingertip moves before a lapse of the predetermined time T0, the determination results in a negative, and the processing proceeds to step S140.

On the other hand, when the fingertip remains at the same position during the predetermined time T0, the determination results in a positive, and the processing proceeds to step S107E.

In this case, the identification of the central position of the designated region desired by the user 8 is completed, and the image processing corresponding to the mode 0 is completed. Therefore, in step S107E, the designated-region identification section 26D changes the mode of the image processing to the mode 1, and the processing proceeds to step S140.

In this way, in the image processing apparatus 16D of the present embodiment, when the current mode is the mode 0, the central position, which is designated by the designation operation of the user 8, of the designated region is identified, and the setting is changed to the mode 1.

Figure 36:
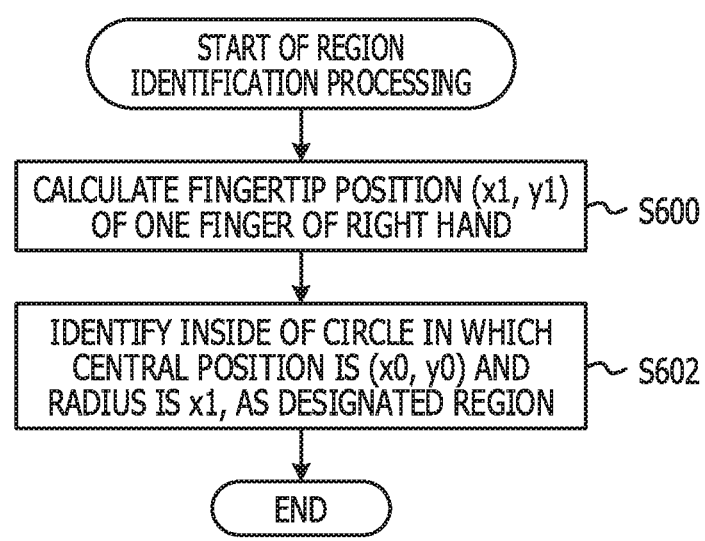
FIG. 36 is a flowchart of an example of region identification processing to be executed in a designated-region identification section according to the fifth embodiment.

The designated-region identification section 26D executes region identification processing in step S113 of image processing to be performed in the mode 1, and this region identification processing is described below. FIG. 36 illustrates a flowchart of an example of the region identification processing to be executed in the designated-region identification section 26D of the present embodiment.

In step S600, the designated-region identification section 26D calculates a position (x1, y1) of the fingertip included in the one-finger shape of the right hand.

Next, in step S602, the designated-region identification section 26D identifies the inside of a circle, in which the central position is (x0, y0) and the radius is x1, as a designated region, and then ends the present processing.

A specific example in Part (2) of FIG. 35 illustrates a state where the circle image 74 representing the designated region is generated as contents, and then superimposed on the captured image 70. The image 72 of the designated region is comparable to the captured image 70.

Step S114 to step S118 after the region identification processing is thus performed is similar to the image processing of the first embodiment (see FIG. 7). It goes without saying that, in step S116 of the image processing of the present embodiment, whether the fingertip in the hand region of the right hand remains at the same position is determined.

In step S139 of the image processing in the mode 4, the drawing-region fixing section 30 changes the mode of the image processing to the mode 0, and then the processing proceeds to step S140.

In this way, according to the image processing apparatus 16D of the image processing system 10D in the present embodiment, the user 8 is allowed to perform all of the designation operations and the specification operations only with the right hand. Therefore, according to the image processing system 10D (the image processing apparatus 16D) of the present embodiment, performing a more intuitive operation is allowed.

As described above, in each of the embodiments described above, the hand-shape analysis section 22 detects the hand region having the one-finger shape of both hands or the right hand, as an example of the first specific shape corresponding to the designation operation of designating a region, on the captured image 70 captured by the image capturing device 14.

The designated-region identification section 26 or 26D starts measuring a time for which the hand region remains still, and identify a designated region designated by the designation operation, when the time for which the hand region remains still becomes equal to the predetermined time.

Further, subsequent to the identification of the designated region, the hand-shape analysis section 22 detects at least the one finger of the right hand, or the hand region of the right spread hand and the specific movement of the hand region, serving as an example of the second specific shape, on the captured image 70 captured by the image capturing device 14.

When the hand-shape analysis section 22 detects the one finger of the right hand, the operation is the specification operation of specifying the execution of the enlargement processing serving as an example of the predetermined image processing for the designated region. Therefore, the drawing enlargement section 28 causes the HMD 12 to display the enlarged image 77 of the designated region. When the hand-shape analysis section 22 detects a movement of the spread hand, the operation is the specification operation of specifying deletion of the display of the designated region. Therefore, the drawing enlargement section 28 deletes the enlarged image 77 or the image 72 of the designated region from the image displayed by the HMD 12.

As described above, the operation recognized by each of the image processing apparatuses 16 and 16A to 16D in the above embodiments, which is either the designation operation or the specification operation performed by the user 8 in the air, is an intuitively recognizable operation. In addition, the gestures of the designation operation and the specification operation are easily recognized by each of the image processing apparatuses 16 and 16A to 16D from the captured image 70 captured by the image capturing device 14.

Therefore, according to each of the image processing apparatuses 16 and 16A to 16D in the embodiments described above, an operation of a user may be appropriately recognized, even when the user is unfamiliar with the operation.

In each of the embodiments described above, use of the right hand when performing an operation (a gesture) with one hand is described. However, this is not limitative, and the left hand may be used, or the image processing apparatus may be adapted to accept either the left hand or the right hand.

The operation (the gesture) of the user 8 in each of the embodiments described above is an example, and is not limited in particular, as long as the operation is a movement that may be intuitively performed by the user 8 in the air. It goes without saying that the operation which follows another image processing operation is a movement that may be easily continued from the previous movement. An example of another operation is described using FIGS. 37 to 39.

Part (1) of FIG. 37 is an explanatory diagram for an operation of designating a region with two fingers of both hands. A shape, in which a thumb and a forefinger of both hands are unfolded, is assumed to be a specific shape. Part (1) of FIG. 37 illustrates a case where a rectangular region, which is designated by the fingers in the hand regions 76R and 76L, is identified as a designated region 104. Further, Part (2) of FIG. 37 is an explanatory diagram for another operation of designating a region with one finger of the right hand. Part (2) of FIG. 37 illustrates a case where a shape in which one finger of the right hand is unfolded is assumed to be a specific shape, and a certain region above the fingertip in the hand region 76R is identified as a designated region 106.

Figure 38:
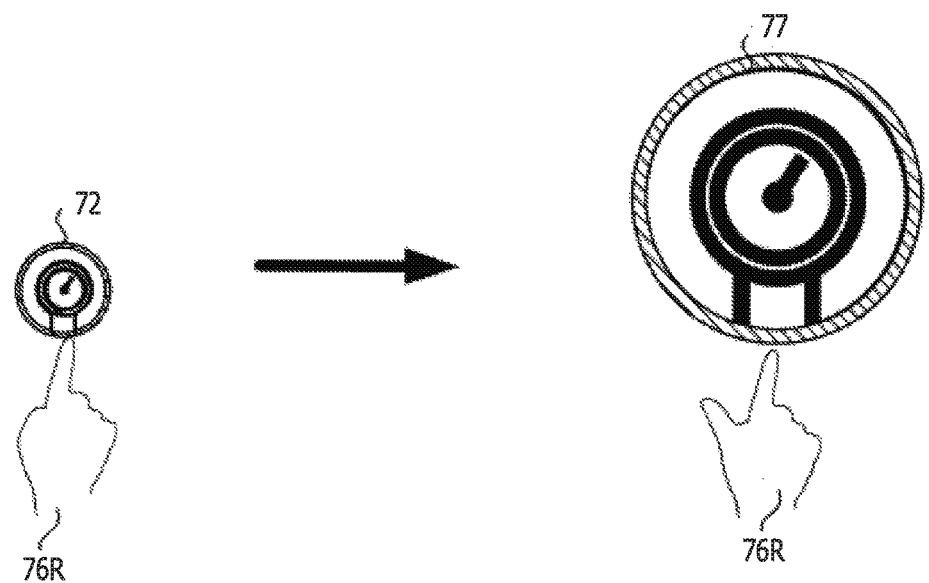
FIG. 38 is an explanatory diagram of another operation of the user.

Further, FIG. 38 is an explanatory diagram for a specification operation of specifying a magnification. In a case illustrated in FIG. 38, first, an enlargement range is specified with one finger of the right hand. Next, when an operation of moving the thumb of the right hand outward is recognized, the HMD 12 displays the enlarged image 77 obtained by enlarging the image 72 in the designated region with a predetermined magnification.

Figure 39:
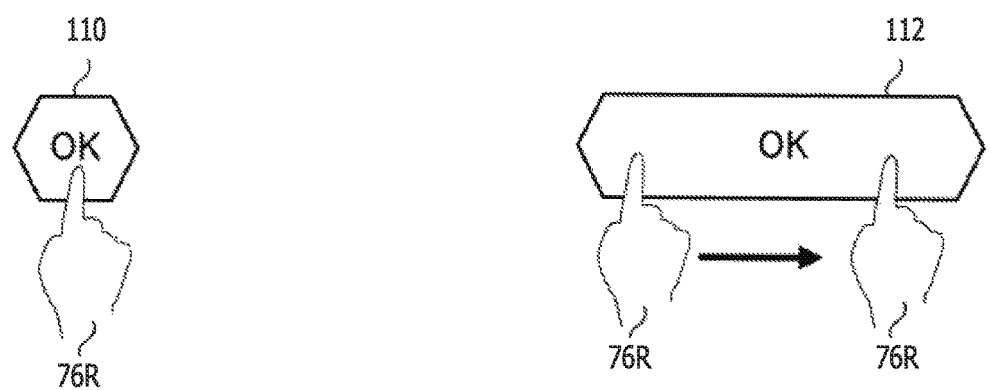
FIG. 39 is an explanatory diagram of another operation of the user.

Furthermore, as another operation, FIG. 39 illustrates a case where one of the image processing apparatuses 16 and 16A to 16D generates an image of an operation button as contents for the user 8 to operate, and, the HMD 12 is caused to display the contents. In Part (1) of FIG. 39, when a finger remains still on an operation button 110 displayed on the HMD 12 for a predetermined time or longer, or when the finger moves as if it pushed the operation button 110 in a depth direction, operating the operation button 110 is recognized. In Part (2) of FIG. 39, when a finger slides (laterally moves) on an operation button 112, operating the operation button 112 is recognized.

It goes without saying that the embodiments described above may be used in combination. In particular, it is preferable to combine the second embodiment with at least one of the other embodiments. When the first or second embodiment is combined with at least one of the third and fourth embodiments, which aspect in these embodiments is to be employed in an image processing apparatus may be determined by recognizing an operation by the user 8, which specifies the aspect.

Further, it goes without saying that the image processing described in each of the embodiments is an example.

Furthermore, in each of the embodiments described above, the shape of the designated region is indicated with a circle, but the shape of the designated region is not limited in particular and may be a shape other than a circle.

In addition, the image processing apparatus 16 may be included in the HMD 12. Moreover, the function of the image processing apparatus 16 may be divided into devices. For example, a part of the function may be included in the HMD 12, and the remaining functions may be provided in another device.

Further, the communication between the HMD 12 and the image processing apparatus 16 may be either wire communication or wireless communication. The communication method may be switched according to a situation or a worksite, where the user 8 uses the HMD 12.

Furthermore, the HMD 12 may include the two or more image capturing devices 14, and the captured image 70 corresponding to the enlarged image 77 may be obtained by one of the image capturing devices 14 and then superimposed on a background image.

Each of the embodiments is described above, using the case where the HMD 12 is of the video see-through (nontransparent) type, but the HMD 12 may be an optical see-through type (an optical transparent type). However, when the HMD 12 is of the nontransparent type, it is preferable to superimpose at least a captured image of a hand of the user 8 on a background image.

The second embodiment is described using the aspect of matching against all the failure patterns registered in the failure pattern DB 34, but is not limited to this aspect.

For example, assume that a correct operation which may be performed after a first operation is performed by the user 8 is a second operation or a third operation. In this case, matching may be performed against only failure patterns corresponding to failure operations conceivable for the second operation and the third operation. In this way, failure patterns to be subjected to matching may be reduced according to a stage where the current operation is among a series of predetermined operations.

There is described above the state where the image processing programs 50 and 50A to 50D are stored (installed) beforehand in the storage sections 46 and 46A to 46D of the computers 40 and 40A to 40D, respectively. However, the image processing programs 50 and 50A to 50D may each be provided in a form of being recorded in a storage medium. Examples of the storage medium include a compact disc read only memory (CD-ROM), a digital versatile disk read only memory (DVD-ROM), and a Universal Serial Bus (USB) device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
   a memory; and
   a processor coupled to the memory and configured to:
   make a display device display an image captured by an image capturing device;
   measure a time for which a hand remains in a first specific shape, the first specific shape corresponding to a designation operation of designating a part in the image;
   identify the part in the image designated by the designation operation when the hand remains still for a predetermined time;
   upon an identification of the part designated by the designation, detecting at least one of the hand in a second specific shape, different from the first specific shape, and a specific movement of the hand in the image captured by the image capturing device to activate a predetermined image processing for the identified part; and
   make a display device display an image processed by the predetermined image processing for the identified part in the image when the at least one of the hand in the second specific shape and the specific movement is detected in the image.

2. The image processing apparatus according to claim 1, wherein the display device is a head mounted display that includes the image capturing device.

3. The image processing apparatus according to claim 1, wherein the image capturing device captures an image of a space in front of a head; and
   wherein the processor configured to make the display device display an image in which the image resulting from the execution of the predetermined image processing is superimposed on the image captured by the image capturing device.

4. The image processing apparatus according to claim 1, wherein the processor is further configured to:
   determine an intended operation from the captured image;
   identify the identified part when the determined intended operation is the designation operation; and
   make the display device display the image resulting from the execution of the predetermined image processing when the determined intended operation is the instruction.

5. The image processing apparatus according to claim 4, wherein the processor is further configured to:
   determine the intended operation to be the designation operation or the instruction when detecting an operation for which information is stored in a memory, the memory configured to store information indicating a failure operation of the designation operation or the instruction.

6. The image processing apparatus according to claim 5, wherein the information stored in the memory is information expressing the failure operation by using a position of a fingertip in a hand region and a trajectory of a position of a barycenter of the hand region.

7. The image processing apparatus according to claim 4, wherein the processor is further configured to:
   detect whether or not there is a failure operation of the designation operation or the instruction,
   when the failure operation of the designation operation or the instruction is detected, make the display device display an operation image representing a correct operation for the determined intended operation.

8. The image processing apparatus according to claim 7, wherein the processor is further configured to:
   detect whether or not there is the failure operation of the designation operation or the instruction, based on the information stored in the memory that stores the information indicating the failure operation of the designation operation or the instruction.

9. The image processing apparatus according to claim 1, wherein the processor is further configured to:
   make the display device visually display a time for which the hand region remains still.

\* \* \* \* \*